US012656132B2

(12) United States Patent
Szubbocsev

(10) Patent No.: US 12,656,132 B2
(45) **Date of Patent: \*Jun. 16, 2026**

(54) RE-ROUTING AUTONOMOUS VEHICLES USING DYNAMIC ROUTING AND MEMORY MANAGEMENT

(71) Applicant: Lodestar Licensing Group LLC, Evanston, IL (US)

(72) Inventor: Zoltan Szubbocsev, Haimhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,002

(22) Filed: Nov. 8, 2023

(65) Prior Publication Data

US 2024/0068825 A1 Feb. 29, 2024

Related U.S. Application Data

(63) Continuation of application No. 17/321,880, filed on May 17, 2021, now Pat. No. 11,841,232, which is a continuation of application No. 16/682,227, filed on Nov. 13, 2019, now Pat. No. 11,015,943, which is a continuation of application No. 15/919,038, filed on Mar. 12, 2018, now Pat. No. 10,495,474.

(51) Int. Cl.
| | |
|---|---|
| *G01C 21/34* | (2006.01) |
| *G05D 1/00* | (2024.01) |
| *G06V 20/59* | (2022.01) |
| *G08G 1/0968* | (2006.01) |

(52) U.S. Cl.
CPC ....... *G01C 21/3453* (2013.01); *G05D 1/0088* (2013.01); *G05D 1/0212* (2013.01); *G06V 20/597* (2022.01); *G08G 1/096827* (2013.01)

(58) Field of Classification Search
CPC ....... B60W 2540/22; B60W 2540/221; B60W 2540/26; B60W 60/0016; G01C 21/3415; G01C 21/3453; G01C 21/3679; G05D 1/0088; G05D 1/0212; G06V 20/597; G08G 1/096827; G08G 1/096844
See application file for complete search history.

(56) References Cited

U.S. PATENT DOCUMENTS

| | | | | |
|---|---|---|---|---|
| 6,756,903 B2 * | 6/2004 | Omry | .................. | B60K 28/066 |
| | | | | 340/978 |
| 6,897,788 B2 * | 5/2005 | Khair | ..................... | A61B 5/061 |
| | | | | 607/30 |
| 8,874,301 B1 * | 10/2014 | Rao | ........................ | B60K 28/04 |
| | | | | 340/576 |
| 9,522,598 B2 * | 12/2016 | Akula | .................. | A61B 5/7282 |

(Continued)

*Primary Examiner* — Babar Sarwar

(57) ABSTRACT

The invention relates to a system and method for navigating an autonomous driving vehicle (ADV) that utilizes ADV an-onboard computer and/or one or more ADV control system nodes in an ADV network platform. The on-board computer receives sensor data concerning one or more occupants occupying an ADV and/or the ADV itself and, upon a detection of an event, automatically initiates a dynamic routing algorithm that utilizes artificial intelligence to re-route the ADV to another destination, for example a healthcare facility. One or more embodiment of the system and method include an ADV on-board computer and/or one or more ADV network platform nodes that utilize in-memory processing to aid in the generation of routing, health and navigational information to advantageously navigate an ADV.

17 Claims, 15 Drawing Sheets

(56)             References Cited

U.S. PATENT DOCUMENTS

| | | | |
|---|---|---|---|
| 9,599,986 B1 * | 3/2017 | Eberbach | B60W 60/007 |
| 10,007,263 B1 * | 6/2018 | Fields | B60W 60/0053 |
| 10,156,848 B1 * | 12/2018 | Konrardy | G06Q 50/163 |
| 10,241,511 B2 * | 3/2019 | Regmi | A61B 5/11 |
| 10,268,195 B2 * | 4/2019 | Majumdar | B60W 60/0059 |
| 10,324,463 B1 * | 6/2019 | Konrardy | G01S 19/39 |
| 2012/0256769 A1 * | 10/2012 | Satpathy | G08B 13/19647 |
| | | | 340/425.5 |
| 2013/0226369 A1 * | 8/2013 | Yorio | G06F 17/00 |
| | | | 701/1 |
| 2015/0149021 A1 * | 5/2015 | Duncan | B60W 60/0051 |
| | | | 701/23 |
| 2016/0303969 A1 * | 10/2016 | Akula | A61B 5/6893 |
| 2018/0120837 A1 * | 5/2018 | Regmi | A61B 5/11 |
| 2018/0211218 A1 * | 7/2018 | Berdinis | G05D 1/0212 |
| 2018/0348759 A1 * | 12/2018 | Freeman | A61N 1/3904 |
| 2019/0033086 A1 * | 1/2019 | Hanai | G01C 21/3415 |
| 2019/0129413 A1 * | 5/2019 | Chamberlain | G07B 15/00 |
| 2019/0187704 A1 * | 6/2019 | Gordon | G05D 1/0088 |
| 2019/0188493 A1 * | 6/2019 | Tiziani | H04H 20/59 |
| 2024/0068825 A1 * | 2/2024 | Szubbocsev | G08G 1/096827 |

* cited by examiner

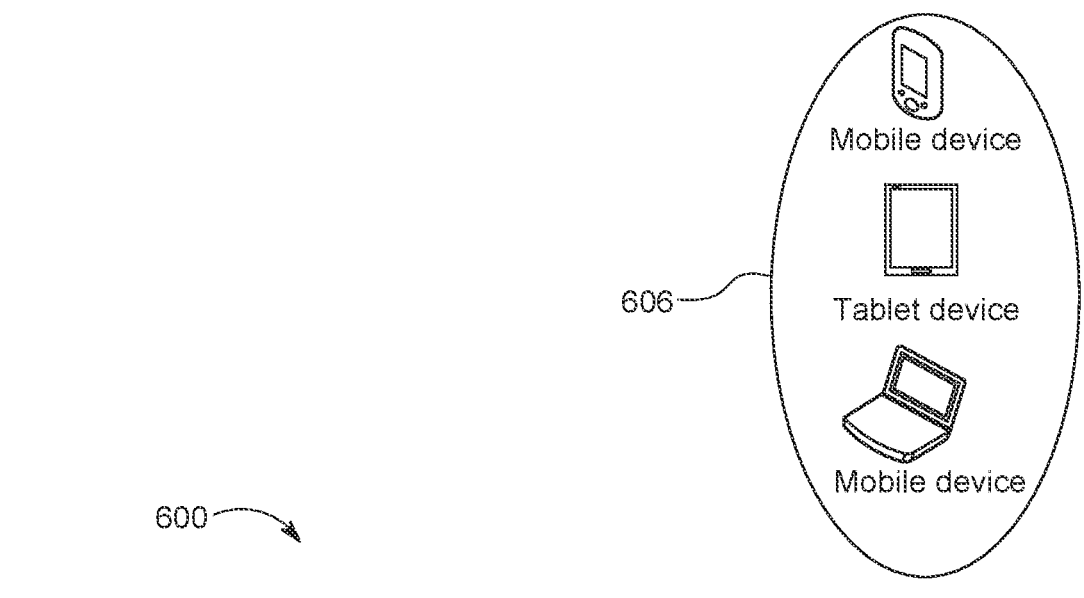
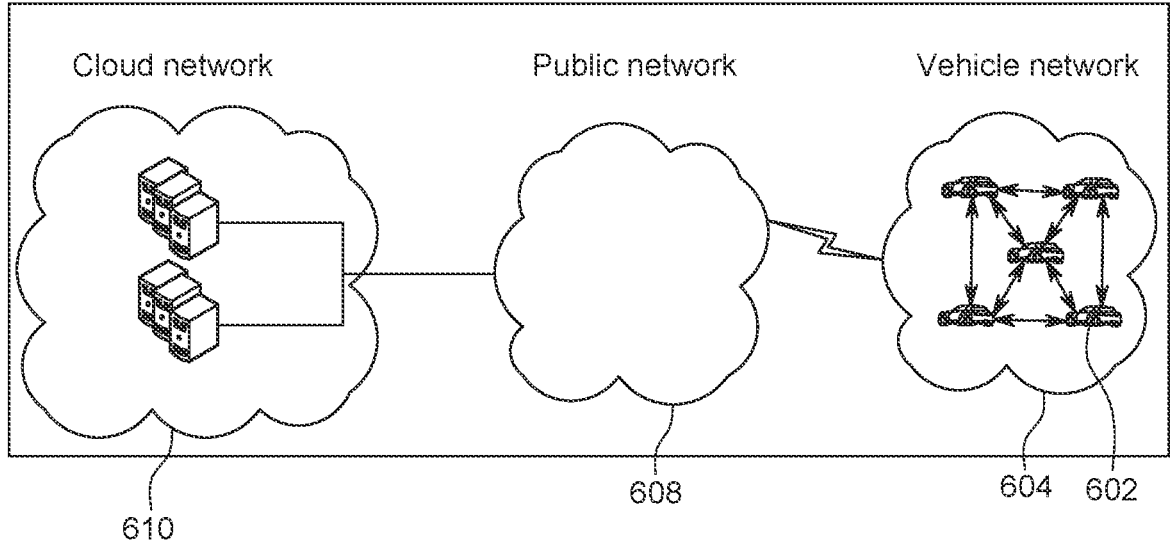
FIG. 6A

800

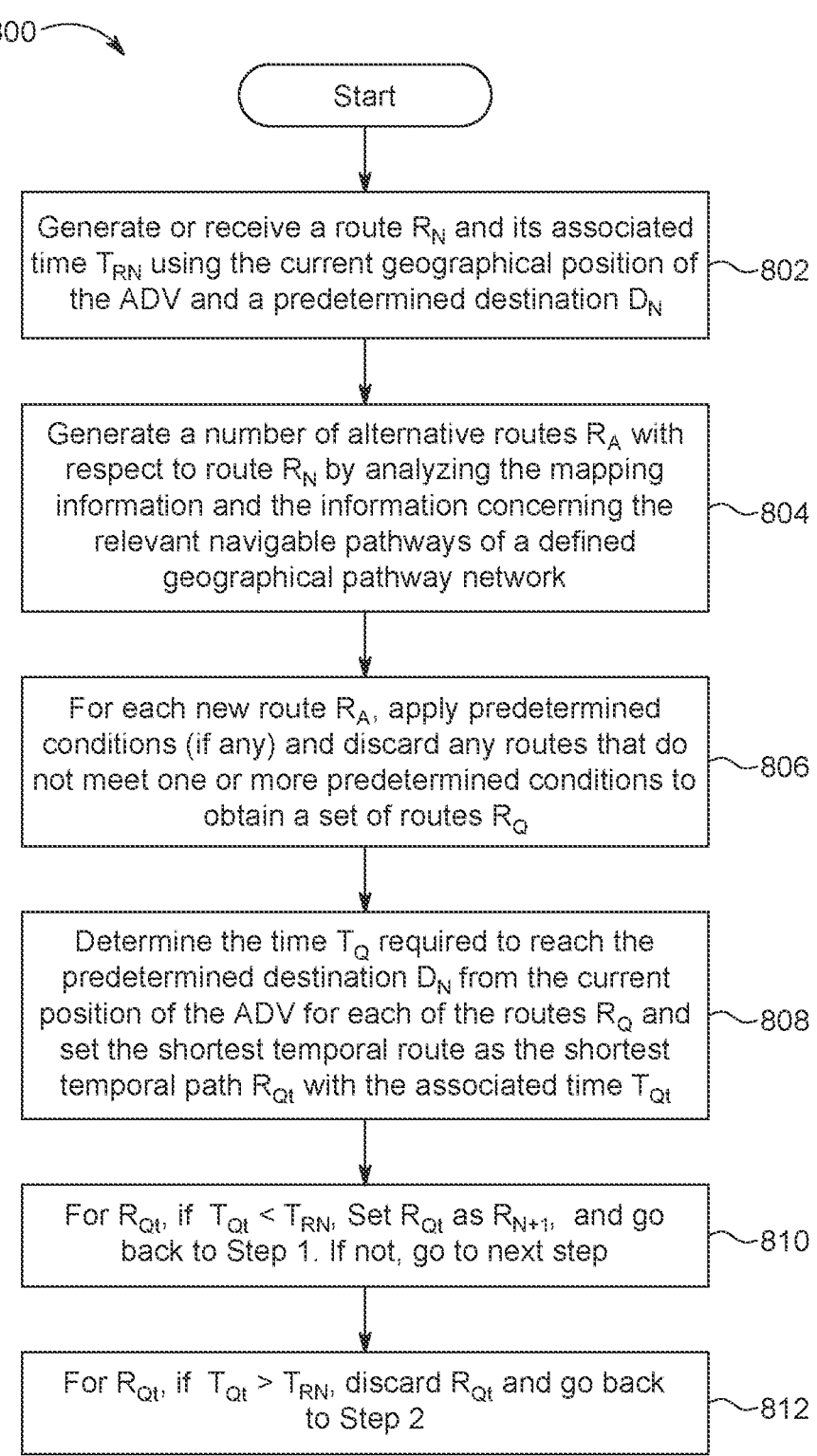

Start

Generate or receive a route $R_N$ and its associated time $T_{RN}$ using the current geographical position of the ADV and a predetermined destination $D_N$ ~802

Generate a number of alternative routes $R_A$ with respect to route $R_N$ by analyzing the mapping information and the information concerning the relevant navigable pathways of a defined geographical pathway network ~804

For each new route $R_A$, apply predetermined conditions (if any) and discard any routes that do not meet one or more predetermined conditions to obtain a set of routes $R_Q$ ~806

Determine the time $T_Q$ required to reach the predetermined destination $D_N$ from the current position of the ADV for each of the routes $R_Q$ and set the shortest temporal route as the shortest temporal path $R_{Qt}$ with the associated time $T_{Qt}$ ~808

For $R_{Qt}$, if $T_{Qt} < T_{RN}$, Set $R_{Qt}$ as $R_{N+1}$, and go back to Step 1. If not, go to next step ~810

For $R_{Qt}$, if $T_{Qt} > T_{RN}$, discard $R_{Qt}$ and go back to Step 2 ~812

FIG. 8

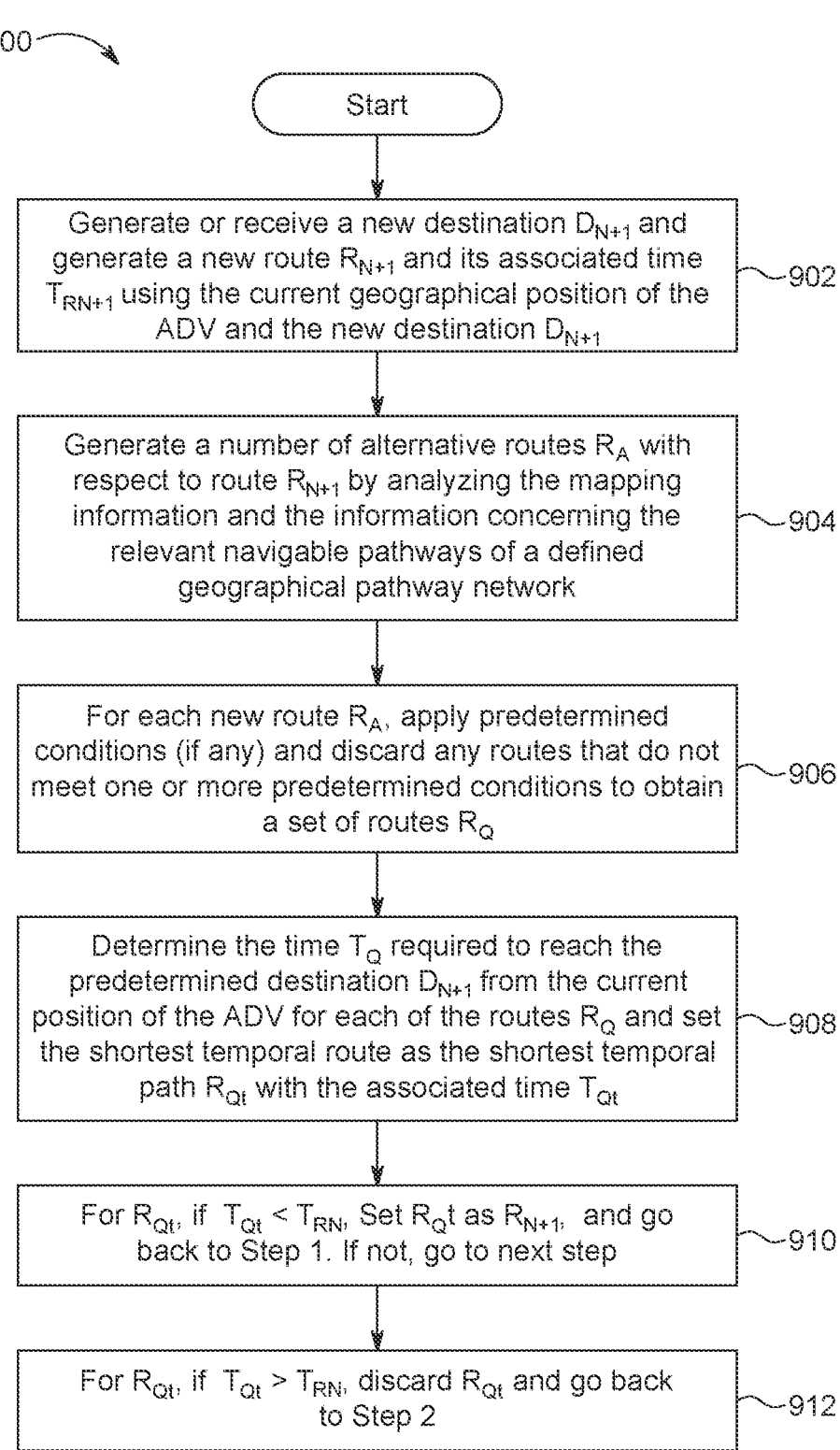

900

Start

Generate or receive a new destination $D_{N+1}$ and generate a new route $R_{N+1}$ and its associated time $T_{RN+1}$ using the current geographical position of the ADV and the new destination $D_{N+1}$ — 902

Generate a number of alternative routes $R_A$ with respect to route $R_{N+1}$ by analyzing the mapping information and the information concerning the relevant navigable pathways of a defined geographical pathway network — 904

For each new route $R_A$, apply predetermined conditions (if any) and discard any routes that do not meet one or more predetermined conditions to obtain a set of routes $R_Q$ — 906

Determine the time $T_Q$ required to reach the predetermined destination $D_{N+1}$ from the current position of the ADV for each of the routes $R_Q$ and set the shortest temporal route as the shortest temporal path $R_{Qt}$ with the associated time $T_{Qt}$ — 908

For $R_{Qt}$, if $T_{Qt} < T_{RN}$, Set $R_Q t$ as $R_{N+1}$, and go back to Step 1. If not, go to next step — 910

For $R_{Qt}$, if $T_{Qt} > T_{RN}$, discard $R_{Qt}$ and go back to Step 2 — 912

FIG. 9

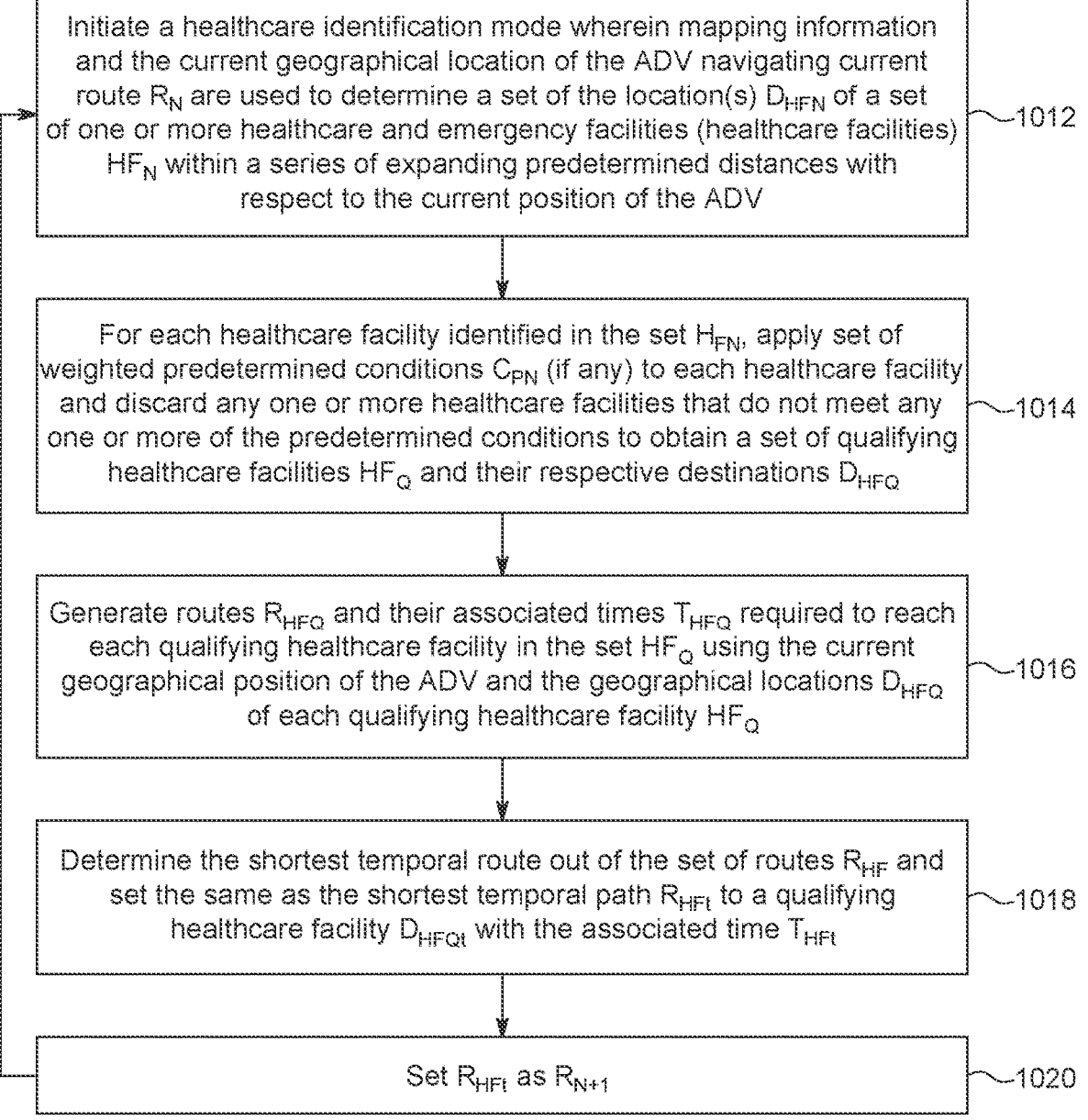

Initiate a healthcare identification mode wherein mapping information and the current geographical location of the ADV navigating current route $R_N$ are used to determine a set of the location(s) $D_{HFN}$ of a set of one or more healthcare and emergency facilities (healthcare facilities) $HF_N$ within a series of expanding predetermined distances with respect to the current position of the ADV ～1012

For each healthcare facility identified in the set $H_{FN}$, apply set of weighted predetermined conditions $C_{PN}$ (if any) to each healthcare facility and discard any one or more healthcare facilities that do not meet any one or more of the predetermined conditions to obtain a set of qualifying healthcare facilities $HF_Q$ and their respective destinations $D_{HFQ}$ ～1014

Generate routes $R_{HFQ}$ and their associated times $T_{HFQ}$ required to reach each qualifying healthcare facility in the set $HF_Q$ using the current geographical position of the ADV and the geographical locations $D_{HFQ}$ of each qualifying healthcare facility $HF_Q$ ～1016

Determine the shortest temporal route out of the set of routes $R_{HF}$ and set the same as the shortest temporal path $R_{HFt}$ to a qualifying healthcare facility $D_{HFQt}$ with the associated time $T_{HFt}$ ～1018

Set $R_{HFt}$ as $R_{N+1}$ ～1020

FIG. 10B

Identify a set of the location(s) $D_{HF_N}$ of a set of one or more healthcare facilities $HF_N$ within a distance dx with respect to the current position of the ADV ~1012A

1012B $HF_N \geq 1$

Yes → Go to 1014

No

Increase the value of dx by X ~1012C

RE-ROUTING AUTONOMOUS VEHICLES USING DYNAMIC ROUTING AND MEMORY MANAGEMENT

RELATED APPLICATIONS

This application is a continuation application of U.S. patent application Ser. No. 17/321,880 filed on May 17, 2021, which is a continuation application of U.S. patent application Ser. No. 16/682,227 filed on Nov. 13, 2019, issued as U.S. Pat. No. 11,015,943 on May 25, 2021, which is a continuation application of U.S. patent application Ser. No. 15/919,038 filed on Mar. 12, 2018, issued as U.S. Pat. No. 10,495,474 on Dec. 3, 2019, each entitled "Re-Routing Autonomous Vehicles Using Dynamic Routing and Memory Management", the entire contents of which applications are hereby incorporated by reference as if fully set forth herein.

FIELD OF THE INVENTION

Various embodiments relate generally to autonomous-driving vehicles, the associated features and capabilities, and the associated systems and methods utilized to perform certain functionalities. More specifically, systems, methods and devices are configured to navigate an ADV and alter a navigation route in various ways based, in part, upon input data and/or sensed data.

BACKGROUND OF THE INVENTION

Typical approaches to driverless cars do not take into account various circumstances that a passenger in a driverless car may face while being motored to a destination. For example, current self-driving vehicles systems do not properly ensure the safety of its occupants while they are in route from a starting point to a final destination. Risks associated with accidents that will adversely affect the both the structure and safe operation of a driverless car as well as medical episodes that may befell a passenger in a self-driving car may increase if the current navigational route of the car may not be changed during the route or if proper monitoring of a patient is not performed.

BRIEF SUMMARY OF THE DISCLOSURE

It is an object of one or more embodiments of the present invention to improve upon the aforementioned deficiencies.

One or more embodiments described herein include a system and/or a method that is used to route and autonomously navigate an autonomous driving vehicle (ADV) using a dynamic routing algorithm that utilizes artificial intelligence and improved memory management. The system and method utilized by one or more embodiments to route and autonomously navigate an ADV using a dynamic routing algorithm that utilizes artificial intelligence and improved memory management includes an on-board computer that is programmed to autonomously navigate a vehicle. One or more embodiments of an ADV include one or more sensor devices communicatively coupled to the on-board computer, and one or more processors that are programmed to determine a vehicle location that represents a current geographical location of the vehicle. One or more embodiments of an ADV determine a first destination that represents a first predetermined geographical destination of the vehicle, generate a map of a geographical region that includes the vehicle location, the first destination, and navigable pathways between the vehicle location and the first destination upon which the vehicle can navigate to reach the first destination. One or more embodiments of an ADV generate a first route that includes the vehicle location, the first destination, and a first set of navigable pathways included in the first route upon which the vehicle can navigate to reach the first destination. One or more embodiments of an ADV analyze information concerning the first set of navigable pathways (e.g., navigable pathway information) included in the first route and generate a first route time that represents the total time it will take the vehicle from the vehicle location to navigate the first route to reach the first destination. One or more embodiments of an ADV set the first route as the current route, set the first destination as the current destination and navigate the vehicle along the current route, periodically determine and update the vehicle location and set each updated vehicle location as a current vehicle location that represents the current geographical location of the vehicle. One or more embodiments of an ADV, in response to the determination of a current vehicle location, update the first route time to the current route time that represents the time it will take the vehicle to reach the current destination from the current vehicle location navigating the current route, generate a first alternative route set that represents a set of one or more alternative routes that the vehicle can navigate from the current vehicle location to the current destination that are different from the current route, wherein each of the alternative routes in the first alternative route set includes at least one navigable pathway that is not included in the current route and each of the other alternative routes. One or more embodiments of an ADV, in response to the identification of a route condition set that represents one or more qualifying route conditions that will be applied to each alternative route in the first alternative route set, apply a route condition set to each alternative route included in the first alternative route set and determine a qualifying route set that includes one or more qualifying routes that meet all of the qualifying conditions. One or more embodiments of an ADV, in response to no route condition set being identified, set an alternative route set as the qualifying route set, analyze information concerning the one or more navigable pathways included in each qualifying route included in the qualifying route set and generate a qualifying route time for each qualifying route that represents a time that it will take the vehicle from its current location to navigate the qualifying route to reach the current destination. One or more embodiments of an ADV determine, from a current route time and each qualifying route time, a shortest time, and in response to the shortest time being shorter than the current route time, automatically set a qualifying route associated with the shortest time as a new current route and navigate the vehicle along the new current route to reach the current destination.

One or more embodiments also include an on-board computer that includes a data storage device communicatively coupled to the one or more processors for retrievably storing data and an in-memory processing system utilized by the processor to perform in-memory processing of data received from the data storage device.

A system and method utilized by one or more embodiments routes and autonomously navigates an autonomous driving vehicle (ADV) using a dynamic routing algorithm that utilizes artificial intelligence and improved memory management. One or more embodiments of an ADV includes an on-board computer that is programmed to automatically re-route the vehicle to a qualifying healthcare facility in response to a detection of an event detected by an on-board computer utilizing data received by one or more sensors. One or more embodiments of an ADV utilizes one or more processors programmed to determine the current vehicle location, generates a first geographical area map that represents a first geographical area that measures a first predetermined distance from the current vehicle location, and identifies a first set of healthcare facilities that represents one or more healthcare facilities that have geographical locations within the first geographical area map. One or more embodiments of an ADV, in response to the identification of a set of healthcare facilities, retrieves a predetermined healthcare condition set that represents one or more weighted qualifying healthcare conditions that are associated with the specific event and apply the healthcare condition set to each identified healthcare facility included in the set of healthcare facilities. One or more embodiments of an ADV determine a qualifying healthcare facility set, that includes one or more qualifying healthcare facilities that meet all of the qualifying healthcare conditions, and generate a first qualifying healthcare route set that represents a set of one or more healthcare qualifying routes that the vehicle can navigate from a current vehicle location to the geographical locations of the healthcare facilities included in the set of qualifying healthcare facilities. One or more embodiments of an ADV generate healthcare qualifying routes associated with a corresponding qualifying healthcare facility and includes one or more navigable pathways between a current vehicle location and a corresponding qualifying healthcare facility, analyze information concerning the one or more navigable pathways included in each healthcare qualifying route included in the qualifying healthcare route set and generate a healthcare qualifying route time for each healthcare qualifying route that represents a time that it will take the vehicle from its current vehicle location to navigate the healthcare qualifying route to reach the corresponding qualifying healthcare facility. One or more embodiments of an ADV determine, from one or more healthcare qualifying route times, a shortest time, and automatically set a healthcare qualifying route associated with the shortest time as a new current route and navigate the vehicle along the new current route to reach the corresponding healthcare facility.

A system and method utilized by one or more embodiments route and autonomously navigate an autonomous driving vehicle (ADV) using a dynamic routing algorithm that utilizes artificial intelligence and improved memory management. One or more embodiments of an ADV include an on-board computer that is programmed to, in response to not identifying a first set of healthcare facilities in a first geographical area map (n=1) that measures a first predetermined distance from the current vehicle location, generates a second geographical area map that represents a second geographical area (n=2) that measures a second predetermined distance from the current vehicle location that is greater than the first geographical area map by a predetermined amount from the current vehicle location. One or more embodiments of an ADV identify a first set of healthcare facilities that represents one or more healthcare facilities that have geographical locations within a second geographical area map. One or more embodiments of an ADV, in response to not identifying a first set of healthcare facilities within a second geographical area map (n=2), generate successive geographical area maps (n=m) that are greater than a geographical area (n=m−1) and identify a first set of healthcare facilities that represents one or more healthcare facilities.

A system and method utilized by one or more embodiments route and autonomously navigate an autonomous driving vehicle (ADV) using a dynamic routing algorithm that utilizes artificial intelligence and improved memory management. One or more embodiments of an ADV include an on-board computer that is programmed to, in response to identifying a first set of healthcare facilities in a geographical area map (n) and not identifying a qualifying healthcare set, determine if one or more of the healthcare facilities included in the first set of healthcare facilities has a geographical location that is greater than a predetermined maximum safety distance measured from a current vehicle location. One or more embodiments of an ADV, in response to determining that no healthcare facilities included in a first set of healthcare facilities has a geographical location that is greater than a predetermined maximum safety distance from a current vehicle location, generate successive geographical area maps (n=m, where m equals 2 to x) that measure a predetermined distance from the current vehicle location that is greater than the previous geographical area map (n=m−1) by a predetermined amount. One or more embodiments of an ADV identifies a successive sets of healthcare facilities that represents all identified healthcare facilities that have geographical locations within a successive geographical area map (n=m+1) and includes any previously identified sets of healthcare facilities. One or more embodiments of an ADV apply a weighted healthcare condition set to each identified healthcare facility included in an aggregated set of healthcare facilities to determine a qualifying healthcare facility set that includes one or more qualifying healthcare facilities that meet all of the qualifying healthcare conditions (n=m). One or more embodiments of an ADV, in response to determining that one or more healthcare facilities included in any set of healthcare facilities has a geographical location that resides at a distance from a current vehicle location that is greater than a predetermined maximum safety distance, remove the one or more healthcare facilities that have geographical locations that reside at distances that are greater than the predetermined maximum safety distance from the set of healthcare facilities. One or more embodiments of an ADV identify a pre-qualifying set of healthcare facilities and remove one or more healthcare conditions from a weighted healthcare condition set (n=m) to apply the remaining weighted healthcare conditions set (n=m−x) to each identified pre-qualifying healthcare facility included in the pre-qualified set of healthcare facilities. One or more embodiments of an ADV determine a qualifying healthcare facility set that includes one or more qualifying healthcare facilities that meets all of the remaining qualifying healthcare conditions (n=m−x).

In one or more embodiments, one or more sensor devices comprise a wearable sensor device comprising one or more sensors configured to monitor a person's health, generate health data and, based upon the received data, determine whether an event has been detected. One or more embodiments of an ADV include a sensor(s) that further includes an interface configured to transmit generated data to an on-board computer, wherein the on-board computer processor (s) is programmed to determine, based upon the received data, whether an event has been detected.

In one or more embodiments, one or more sensors are configured to monitor a person's health and generate health data by calibrating the one or more sensors with respect to one or more of the relevant person's vital signs to obtain a normal range for the one or more vital signs. One or more embodiments initiate a monitoring mode, by an on-board computer, wherein the on-board computer is ready to receive health data. One or more embodiments process received health data to determine in real time if one or more events has been detected, wherein the processing includes analyzing the sensor data to determine current measurements of one or more vital signs, and comparing the current measurement of the one or more vital signs to a predetermined normal range for a relevant person.

The above discussion/overview is not intended to describe each embodiment or every implementation of the present disclosure. The Figures and detailed description that follow also exemplify various embodiments.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6A is a diagram depicting an example of an ADV control system network platform, according to some embodiments;

FIG. 8 is an example of a block diagram including a flow charts of one or more steps performed by one or more processors and/or other devices to alter a previous navigation route stored and/or undertaken by an ADV based upon sensor and/or other data received by the processor(s), according to some embodiments;

FIG. 9 is an example of a block diagram including a flow charts of one or more steps performed by one or more processors and/or other devices to alter a previous navigation route stored and/or undertaken by an ADV based upon sensor and/or other data received by the processor(s), according to some embodiments;

FIG. 10B is an example of a block diagram including a flow charts of one or more steps performed by one or more processors and/or other devices to alter a previous navigation route stored and/or undertaken by an ADV based upon sensor and/or other data received by the processor(s), according to some embodiments.

DETAILED DESCRIPTION OF THE DISCLOSURE

One or more embodiments of the ADV described herein are configured to autonomously drive one or more ADV occupants to a destination as described herein. For example, if one or more ADV occupants succumbs to illness or is stricken with a medical condition and is unable to communicate with the ADV, one or more embodiments of the present invention will detect an event and automatically re-route the ADV to health facility that can render aid to the one or more relevant ADV occupants. In one or more embodiments of the present invention, while an ADV is functioning to autonomously navigate across a geographical network, one or more sensors utilized by an on-board computer of the ADV is continuously or periodically monitoring one or more of the occupants of the ADV as described herein. In these embodiments, if an event occurs, the on-board computer 204 will automatically re-route the ADV to a healthcare facility utilizing a dynamic routing algorithm that utilizes artificial intelligence to continuously determine the shortest pathway to reach the new destination from the current location of the ADV as described herein.

One or more embodiments of the present invention functions to generate routing information, mapping information, navigational information, health information, routes, reference information including a current position of one or more ADVs, timing information including current times to reach a current destination, etc., as described herein.

Figure 1:
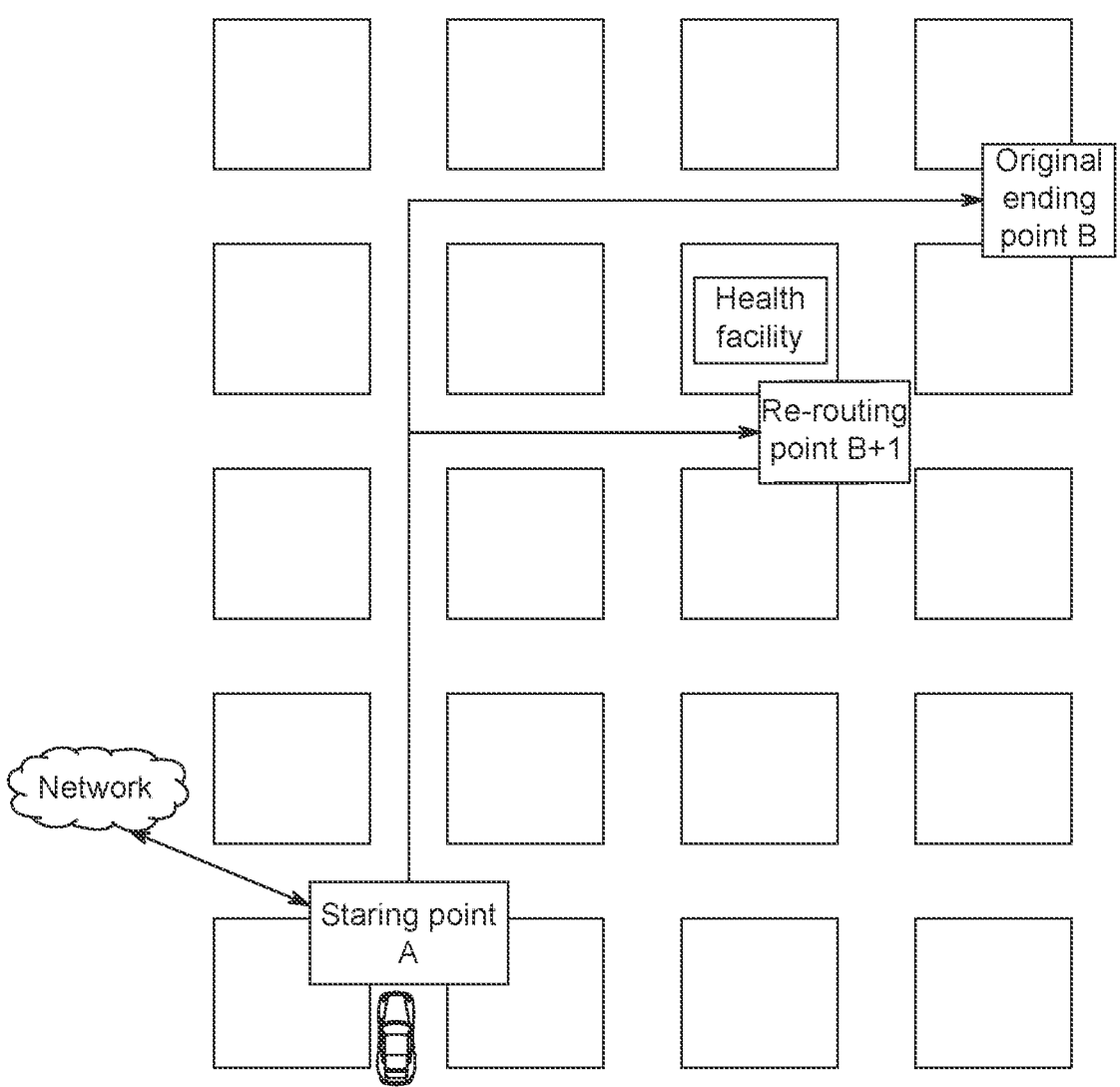
FIG. 1 is a diagram depicting an example of an implementation of a navigation method and system for an ADV that is utilizing navigation technology that relies upon data utilized by an on-board navigation system to route an ADV, according to some embodiments.

FIG. 1 illustrates at least a portion of an ADV navigation system (e.g., ADV 602) and generally illustrates one or more of its capabilities to generate a route $R_N$ for an ADV, use input data, sensed data and/or other data to navigate an ADV from a geographical starting point A to a geographical ending point B (i.e., predetermined destination $D_N$), and automatically re-route an ADV using input data, sensed data and/or other data to a new geographical ending point B+1 (i.e., new destination $D_{N+1}$) using a navigation system based upon one or more embodiments described herein. For simplicity sake, one ADV is shown performing routing and navigation operations on roadways provided within a single geographical area. However, one or more embodiments of the ADV navigation system network (described with reference to FIG. 6) can function to aide a fleet of ADVs to route and navigate a plurality of ADVs throughout the same or different geographical areas on navigational pathways. In one example, ADV 602 includes a vehicle identification that may be utilized by the on-board navigation system to allow for the operation of the same. In other examples, the vehicle identification can be transmitted over a network to a remote navigation service (RNS) that resides within one or more nodes 502 residing within an ADV network 610 that enables the RNS to check the status of each the ADV, transmit navigation information to each ADV (e.g., starting point, destinations, mapping information, routing information, routes, geographical locations of artifacts, etc.). The vehicle identification can include occupant sensory and/or identification data, data concerning a route and/or other navigation data, and/or sensory, navigation, control and/or any other data discussed herein concerning the vehicle, the route, and/or the occupants therein. Examples of the embodiments described below are applicable to a single ADV and a fleet of autonomous-driving vehicles and can generate routing information and navigate one or more ADVs across short and long distances, including between and within facilities, geographical areas, neighborhoods, towns, cities, states, countries, etc. As shown in FIG. 1, an ADV 602 is being controlled by an on-board navigation system, embodiments of which are disclosed herein, to determine a route $R_N$ between starting point A and ending Point B and autonomously drive (i.e., navigate) the ADV from starting point A to ending point B along navigation route R (route R). In this example, ADV 602 is a passenger vehicle that is configured to autonomously move one or more persons along Navigation Route R using an on-board navigation system. In other embodiments, ADV 602 may be any vehicle that uses navigational pathways to navigate a geographical area.

An ADV 602 shown in FIG. 1 includes ADV sensors that can be used to collect data to navigate the ADV through its surroundings, sensors used for collecting data about one or more vehicle occupants, and an on-board navigation computer that uses at least a portion of the data that is communicated via the aforementioned sensors in connection with other data to navigate (i.e., the ADV autonomously drives the ADV occupants) the ADV along a route R to a predetermined destination. For example, in one embodiment, one or more of the ADV sensors described herein that are included in and/or associated with an ADV can be utilized to sense vital signs of one or more occupants of the ADV. The sensors can be configured to detect one or more vital signs including blood pressure, temperature, respiration rates and heart rates or other physiological states and/or data points. The sensors for detecting the vital signs or other physiological states and/or data points can either be non-contact sensors that can perform periodic, continuous and/or long-term monitoring of the occupant's vital signs, one or more wearable sensors that are attached to one or more vehicle occupants to perform periodic, continuous and/or long-term monitoring of an occupant's vital signs, or various combinations of non-contact sensors and wearable sensors to communicate an occupant's vital signs to the on-board navigation computer and controller. For example, during and/or after the ADV has determined a route R, the ADV on-board computer is processing data received by one or more sensors to monitor the vital signs of one or more ADV occupants and navigate the ADV along a route $R_N$. If the on-board computer determines that one or more relevant vital signs and/or additional detections, occurrences, measurements, readings or sensed data concerning either the ADV or one or more ADV occupants is indicative of an event, the on-board computer is programmed to automatically determine a new route $R_{N+1}$, using an emergency dynamic re-routing algorithm that utilizes artificial intelligence to navigate the ADV to a new destination $D_{N+1}$, as depicted in FIG. 1. In one or more embodiments, a sensor is a sensor device that can be a system, an apparatus, software, hardware, a set of executable instructions, an interface, a software application, a transducer and/or various combinations of the aforementioned that include one or more sensors utilized to indicate, respond to, detect and/or measure a physical property and generate data concerning the physical property.

Figure 2A:
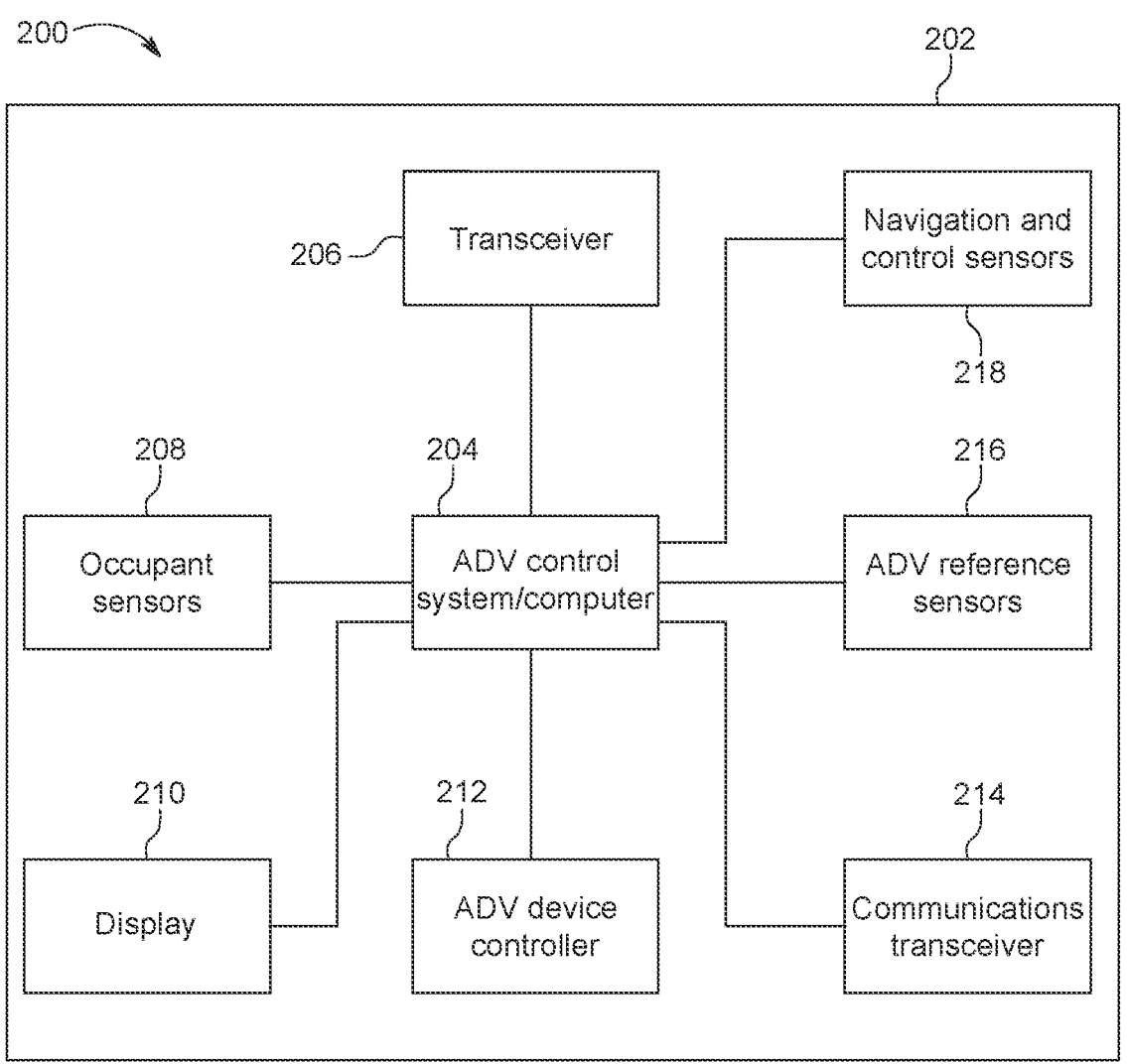
FIG. 2A is an example of a functional block diagram depicting a system including an ADV on-board navigation system that is utilized to control an ADV, according to some embodiments.
Figure 2B:
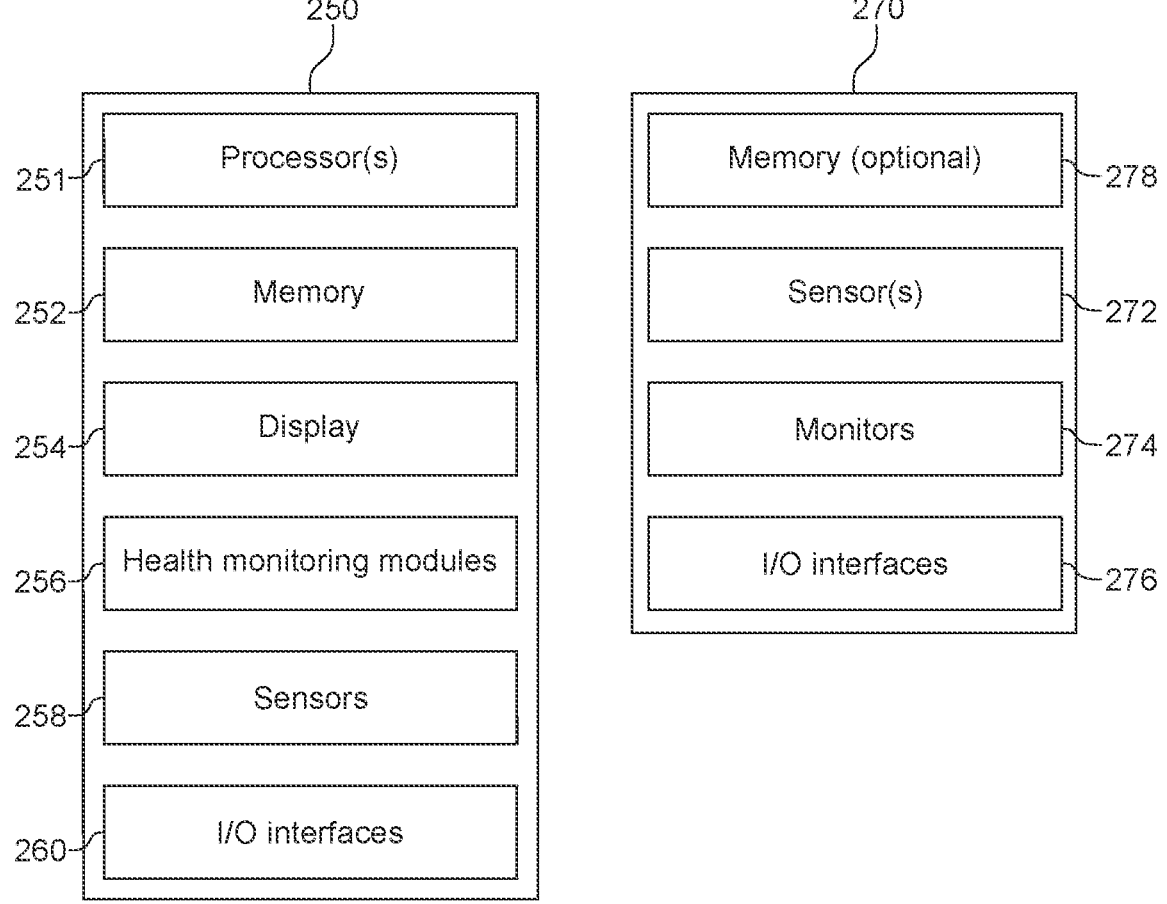
FIG. 2B is an example of a functional block diagram depicting an ADV occupant monitoring system that is utilized to monitor one or more occupants of an ADV, according to some embodiments.
Figure 3:
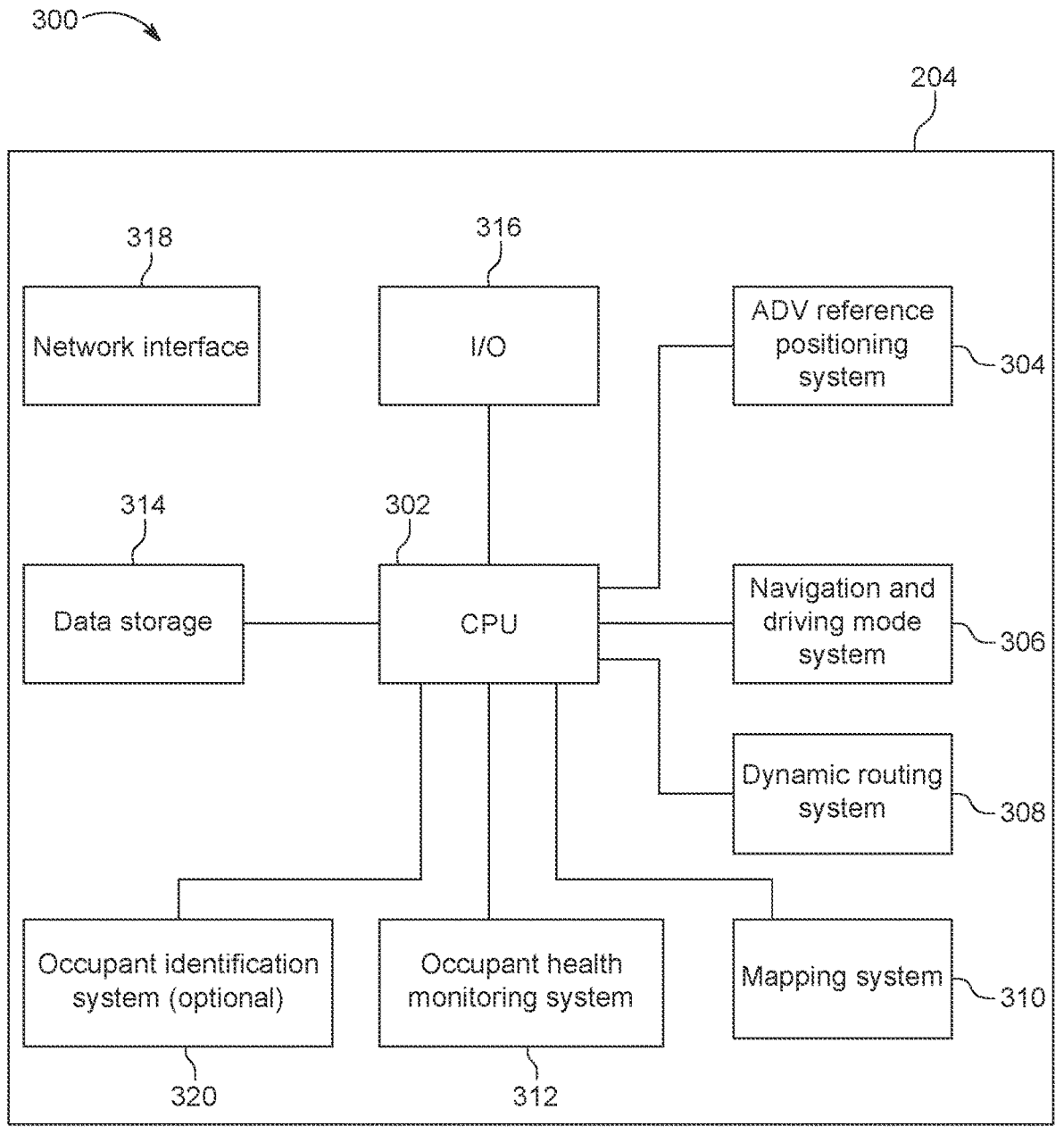
FIG. 3 is a diagram depicting an example of an architecture for an ADV control system and on-board computer, according to some embodiments.

FIGS. 2A, 2B and 3 are functional block diagrams of an embodiment of an on-board ADV navigation system 200 that can be used to route and navigate an ADV 602 generally shown in FIG. 1. As shown in FIG. 2A, each embodiment of an ADV described herein has an on-board computer and control system (on-board computer) 204 that operates to autonomously position and control an ADV to navigate the same from a geographical starting point A to a geographical ending point B without requiring an ADV occupant to accelerate, idle, engine-throttle, steer, brake, or warn (e.g., using a vehicle horn, wiper blades, hazard lights, or using a turn signal) another vehicle or pedestrian of an action that may somehow affect the other vehicle or pedestrian. The sensor data generated by the sensors described with reference to FIG. 2A will be processed by the on-board computer 204 described with reference to FIGS. 2A, 2B and 3 to autonomously navigate and control the ADV. The on-board computer 204 operates to among other things, for example, generate, determine and/or monitor 1) routing information that includes, when necessary, re-routing information, 2) navigational information to navigate an ADV from a geographical starting point to a geographical ending destination, and 3) sensor information that digitally describes an ADV's external surroundings, vehicular activities, and one or more of an occupant's health and current state. For example, an ADV's driving devices such as, for example, a steering wheel, a brake pedal, a gas pedal, a turn signal, a mirror(s), and a caution horn will be controlled by an ADV device controller 212 pursuant to control signals transmitted by the on-board computer 204 described with reference to FIG. 3. The on-board computer 204 communicates with the ADV reference sensors 216 and the navigation and control sensors 218 to receive the associated sensor data and processes the same to autonomously drive the ADV utilizing ADV device controller 212.

To assist the on-board computer 204 in navigating the ADV, the ADV reference sensors 216 generate sensor data (e.g., that generate sensor data concerning the direction the ADV is facing and the orientation of the ADV) that is processed by the on-board computer 204 via the ADV reference positioning system 304 to determine the geographical position and location of an ADV on the Earth's surface, a position which is correlated with a navigational map of a relevant geographical area via the mapping system 310 to enable the on-board computer 204, utilizing the dynamic system 308, to ultimately determine a route $R_N$ and additional routes $R_{N+M}$. For example, in one embodiment, a reference positioning system 304, described with reference to FIG. 3, is included within the on-board computer 204 and utilized to receive the sensor information generated by the ADV reference sensors 216 to generate positioning information that represents the location of the ADV on the Earth and, ultimately, a geographical location on a map. The location information can include, for example, the direction the ADV 602 is facing and/or headed (e.g., the directions being the cardinal directions and ordinal directions), the ADV's orientation (e.g., angle of inclination and rotational position). In another embodiment, ADV reference system 304 can be a stand-alone device that generates positioning and reference data that may be input into on-board computer 204 utilizing one or more I/O ports 316 to program the CPU to perform the described functionality.

In one or more embodiments, maps generated by on-board computer 204 include mapping information such as navigable pathways that an ADV can navigate, the geographical location of geographical artifacts that are found along the navigable pathways and/or the relevant geographical region, artifacts including, for example, one or more of city streets, tolls, lights, bridges, highways, street cameras, structures, businesses, identified accidents or traffic jams, locations, etc. that may exists and are identifiable geographically within the relevant geographical area. For example, the on-board computer can query the database or utilize the in-memory processing system described herein to obtain the geographical location(s) of a certain type of geographical artifacts (e.g., healthcare facilities, gas stations, schools, banks, arenas, ballparks, etc.) and receive a list of addresses or a display of the aforementioned relevant artifacts that appear on a map generated on a display 210 and referenced as a symbol or any other display device that can be used to visually represent one or more of the relevant geographical artifacts on the display 210.

In one embodiment, the positioning system can use a global-positioning system (GPS), the Quazi-Zenith Satellite System (QZSS), Beidou, Galileo, Globalnaya Navigazion-naya Sputnikovaya Sistema or Global Navigation Satellite System (GLONASS), or any other system that is accurate enough to determine the position of an ADV within the time and distance constraints such that the position can correlate with mapping information generated utilizing mapping system 310, be continuously updated, and fall within certain positioning distances such that navigation of the ADV 602 can be safely achieved while maintaining the accuracy of the routing information generated by utilizing dynamic routing system 308. Depending upon the size of the area to be navigated, Indoor Positioning System (IPS) can also be used as the other positioning systems described herein.

The ADV referencing sensors 216 can include sensors that measure the physical movement and orientation of the ADV, including but not limited to one or more accelerometers, geomagnetic field sensors, speedometers, etc. The current position of the ADV is continuously updated and used by the navigation and driving mode system, routing system and mapping system that are part of the on-board computer 204, described with reference to FIG. 3, to generate routing information and autonomously navigate the car along the generated route.

Navigation and control sensors 218 described with reference to FIGS. 2A, 2B generate sensor data that is communicated to the navigation and driving mode system 306 that is utilized by the on-board computer 204 described with reference to FIG. 3. The navigation and control sensors 218 can include, for example, one or more infra-red sensors, gyroscopes, lasers and/or other light sensors, accelerometers, air flow meters, barometric sensors, vibrational sensors, electromechanical sensors, sensors that measure force, sensors that measure weight, and other sensors that may be utilized to measure physical movement, physical impact, distance, speed, direction, orientation (angle, rotation) and time. In another embodiment, one or more sensors that generate data concerning the positions of the steering wheel, one or more tires and/or steering column, and/or one or more sensors that read or utilize the data generated by the on-board speedometer an also be used by the navigation and driving system to navigate the ADV along a predetermined route. Navigation and control sensors 218 can also include sensors that detect roadway conditions (e.g., mud, water, snow, ice, potholes, gratings, uneven pavement, gravel, grass, lack of pavement, etc.) and the data generated by these sensors 218 can be used by on-board computer 204 via navigation and driving mode system 306 to control and navigate the ADV in a manner that is determined to be safe depending upon the sensed condition. Navigation and control sensors 218 that can be utilized to detect roadway conditions are vibration sensors, cameras, heat sensors, temperature sensors, lasers and/or other light sensors, moisture sensors, or any other sensor or sensors that can generate data that is indicative of a navigational pathway.

The navigation and driving mode system 306 can also use navigation and control sensors 218 to avoid obstacles along the route such as other vehicles, road obstructions (safety cones, construction, debris, etc.), pedestrians, hanging obstructions (e.g., bridges, tree limbs, light fixtures, etc.) and the like to safely navigate the ADV along a route. In this embodiment, navigation and control sensors can be one or more electromagnetic energy sensors such as radar and/or lidar, or one or more acoustic sensors such as, for example, sonar sensors, cameras that are used to detect traffic lights, stop signs, and any other structure or device intended to visually communicate information, or any combination of navigation and control sensors 218 described herein intended to effectively navigate the ADV along a route. The sensor data generated by one or more the aforementioned radar, lidar and/or sonar sensors described herein is used by the navigation and driving system to determine the distance of the relevant object from the ADV and navigate the ADV around the same if an action is required. The on-board computer 204 uses the continuously updated location information of the ADV and the sensor data generated from the navigation and control sensors 218 to navigate and control the ADV safely and effectively along a predetermined route in a manner such that the speed of the ADV is continuously monitored and controlled, the direction and orientation of the ADV is continuously monitored and controlled, traffic signs and warning signs are sensed and obeyed, and obstacles that are present along the route are safely negotiated by taking on more actions that safely avoid the obstacle (e.g., stopping the vehicle, going around the obstacle, increasing or decreasing the speed of the ADV, making the ADV perform a U-turn, or some other course of action to safely avoid the obstacle) while continuing to navigate the ADV to a geographical predetermined destination identified on a route generated by the on-board computer 204.

One embodiment of the ADV 602 uses occupant sensors 208, described with reference to FIGS. 2A, 2B and 3, to generate data that is received by on-board computer 204 to monitor various aspects of the health and well-being of one or more occupants residing within the ADV via the occupant health monitoring system 312. For example, the occupant sensors 208 can include sensors that measure one or more of an occupant's blood glucose level, blood pressure, temperature, heart rate, pulse rate, electrocardiograph (ECG) patterns, respiration rate, respiration effectiveness (e.g., blood oxygen saturation). In one embodiment, the occupant sensors 208 can be contact sensors, such as wearable devices that are attached to an ADV occupant. For example, the wearable device can include one or more contact sensors, embedded memory, a transceiver to transmit the sensor generated data to an on-board computer 204, and one or more processors to process the generated sensor data into measurements indicative of vital signs and/or physiological information concerning the relevant ADV occupants. The on-board computer 204 can be configured to receive the occupant sensor data from one or more occupant sensor 208 and utilize the occupant health monitoring system 312 to process the generated sensor data into measurements indicative of vital signs and/or physiological information concerning the relevant ADV occupants (health information), display information indicative of an ADV occupant's health or current physiological state, transmit the generated or received health information to one or more control and system nodes 502 (described with reference to FIG. 5) for further processing, and/or further process the health information and perform other functions with the measurements (e.g., re-route the ADV as described herein). In another embodiment, the occupant sensors can be contactless sensors that generate sensor data from contactless interaction with one or more occupants residing within the ADV and transmit the sensor data to the occupant health monitoring system to process the data into measurements and perform other functions with the measurements. In still another embodiment, the occupant sensors may be a combination of both wearable and contactless sensors.

In one embodiment, described with respect to FIG. 2B, one or more ADV occupants can wear one more occupant sensors 208 that are configured as an ADV wearable occupant sensor device 250 and one or more accompanying wearable sensor devices 270. For example, an ADV wearable occupant sensor device 250 can be worn by itself, or in combination with one or more accompanying wearable sensor devices 270 that are configured to transmit sensory data and/or other health information, depending upon the health metric (e.g., vital sign, physiological state, etc.) to be measured, to the wearable occupant sensor 250 that will, in turn, transmit sensor data and health information to on-board computer 204. It is to be appreciated that occupant sensor device 250 is configured to work alone to monitor, capture and transmit sensory data and health information to an ADV on-board computer 204, and/or support a set of one or more wearable sensor devices 270 in monitoring and transmitting sensory data and other health information captured by wearable sensor devices 270 to an ADV on-board computer 204 for further processing. In one embodiment, wearable occupant sensor 250 is configured to be a watch that can be disposed on an occupant's wrist to monitor and store health sensory data using one or more of its sensors 258 and its memory 252. Either or both of the wearable occupant sensor 250 and the set of wearable sensor devices 270 can be configured as a wrist band, ring, ankle accessory, headband, glove, arm band, or sensing strip to be secured adhesively to an occupant's appendage or body surface.

In one embodiment, wearable sensor device(s) 270 includes a memory 278 that may be utilized to store data indicative of an ADV occupant's health and/or physiological state. In one or more embodiments, wearable sensor device(s) 270 is configured as a pass through device that transmits the sensor data to one or more wearable occupant sensor devices 250, or directly to an on-board computer 204 for processing. The measured sensory health data and/or sensor generated data is transmitted to an ADV on-board computer 204 that is communicatively coupled to occupant sensor device 250 via one or more interfaces 260. Occupant sensor device 250 can also include a display 254, one or more health monitoring modules 256, one or more sensors 258, one or more processors 251 that, for example, 1) receive data from the one or more sensors 258, 2) execute instructions according to the one or more health monitoring modules 256, 3) generate health information utilizing the one or more health monitoring modules 256, 4) receive information and data from a GUI that is part of a display device 254, and/or 5) transmit health information and data to the on-board computer 204 utilizing one or more transceivers. The occupant sensor device 250 includes one or more input/output interfaces that enable the communication of data over a wired or wireless network to an ADV on-board computer 204. For example, wearable occupant sensor device 250 and ADV wearable health sensors 270 may include one or more input/output interfaces 260 and 276, respectively, that include transceivers that are configured to both communicate with one another and/or an ADV on-board computer 204 via their compliance with one or more various standards that use wireless communication methods proposed by the Institute of Electrical and Electronics Engineers (IEEE), such as IEEE 802.11, IEEE 802.15, IEEE 802.16, and IEEE 802.20. IEEE 802.11 is a set of standard specifications for wireless networks, such as wireless LAN and wireless LAN including one portion of Infrared Communication and so on. IEEE 802.15 is a set of standard specifications for wireless Personal Area Network (PAN) including Bluetooth, UWB, ZigBee, and so on. It is to be appreciated that IEEE 802.16 is a set of standard specifications for wireless Metropolitan Area Network (MAN) (Broadband Wireless Access (BWA)) including Fixed Wireless Access (FWA) and so on. IEEE 802.20 is a set of mobile Internet standard specifications for wireless MAN (Mobile Broadband Wireless Access (MBWA)), just to name a few for exemplary purposes. In another embodiment, both occupant sensor device 250 and wearable health sensors 270 are configured to transmit, via one or more I/O interfaces 260, health sensory data and other information to an ADV on-board computer 204 using one or more wireless standards provided herein or through wired communication, for example wireless and wired USB standards, or use mesh transceivers to communicate over a mesh network with one another and on-board computer 204.

As will be described herein with reference to FIG. 2B, either one or both the occupant sensor device 250 and one or more wearable health sensors 270 can include one or more sensors 258, 272 for monitoring health sensory data and/or detecting one or more health conditions and/or various physiological states of an occupant. It is to be understood that because each of the health monitoring sensors 208 discussed herein can include one or more of wearable health sensors 270 and/or one or more occupant wearable sensor devices 250, in each instance where a particular sensor is discussed in relation to the occupant sensor device 250, the discussion is also directed to each of the one or more wearable health sensors 270. In one embodiment, both the occupant sensor device 250 and set of wearable health sensors 270 are configured to continuously transmit the sensed data of one or more occupants at predetermined temporal intervals to an ADV on-board computer 204 once the device 250 and one or more sensors 270 are activated.

For example, in one embodiment, occupant wearable sensor device 250 can include one or more sensors 258 for detecting movement (or the lack thereof) including a GPS sensor, an accelerometer, a gyroscope or any other type of motion sensor configured to generate sensor data that is indicative of movement. For example, the lack of movement over a prolonged period of time or 'jerky' movements of certain monitored body parts by an occupant sensor 250 or one or more wearable health sensors 270 may indicate a health condition. In one or more embodiments, sensory data generated by an occupant sensor 250 or one or more wearable health sensors 270 is analyzed in conjunction with additional sensory data generated by one or more occupant sensors (e.g., occupant sensor 250 or one or more wearable health sensors 270) 208 that indicate the relevant ADV occupant's heart rate. The occupant sensors 208, including the wearable sensor 250 and/or one or more wearable health sensors 270, can include any type of sensor configured to monitor stress, temperature, or any of an ADV occupant's vital signs and generate one or a combination of one or more health metric measurements and/or data indicative of a health metric (e.g., vital sign, physiological state, other indicator of health described herein, etc.) to confirm a current health state of the relevant ADV occupant.

In one embodiment, occupant wearable sensor device 250 can include a heart rate monitor that is configured to generate data concerning one or more heart rate measurements sensed in real time. In this embodiment, the ADV on-board computer 204 includes an occupant health monitoring system 312 that will be utilized to determine if, based upon the heart rate and/or other sensory data the relevant ADV occupant is currently having a heart attack, a stroke attack, a panic attack and/or is within a physical state that is approaching the same, all examples of an event. For example, the ADV on-board computer 204 and/or the occupant sensor device 250 will calibrate itself upon initialization to determine a baseline resting heart rate and use the same to determine what is considered to be a normal range for the relevant ADV occupant. Once the sensory data concerning the occupant's heart rate is received by the on-board computer 204, and/or the health monitoring module 256, the heart rate data will be processed to determine the necessary heart rate measurements of the relevant occupant. For example, the current heart rate of the relevant occupant may be compared with what has been determined to be a normal heart rate range via the initialization process, historical data that takes into account the relevant occupant's metrics (e.g., sex, age, weight, race, height, etc.) and the healthy heart rates of person's with similar physical and/or physiological and/or emotional attributes, and/or any other data that can be used to suggest the current state of the relevant ADV occupant when comparing the data against the ADV occupant's current health measurements.

For example, in one or more embodiments, the vital signs that can be measured by occupant sensors 208 include blood pressure, temperature, pulse, respiration, oxygen saturation, and pain assessment. In one or more embodiments, the sensors 208 can be calibrated against historical data that indicates certain normal ranges for adults of a certain age, sex, race, weight, height, etc. For example, historical data may indicate the following: The normal ranges for blood pressure in adults are systolic pressure between 90 and 120 mm Hg (millimeters of mercury) and diastolic pressure between 60 and 80 mm Hg; The normal range for core temperatures varies from 97° F. to 99.6° F. (36.1° C. to 37.5° C.), with the average being 98.6° F. (37° C.); The normal range for an adult pulse is 60 to 100 bpm; The normal range for adult respirations is 12 to 20 breaths per minute; The normal $SpO_2$ range is between 96% and 100%; Pain is assessed using a pain scale of 1 to 10 for adults and a scale that includes a series of facial expressions for children. Using historical data and current measurements, one or more sensors 208 may be calibrated to determine the normal vital sign levels of one or more ADV occupants and, thereafter, utilize these calibrated levels to determine if an event has been detected.

For example, in the current example, based upon the calibrations of the one or more medical sensors, an on-board computer may receive a blood pressure reading that suddenly exceeds 180/120 mm Hg. In one example, when this reading is compared to a normal range or threshold, described above, the onboard computer will indicate that an event (i.e., myocardial infarction (i.e., heart attack)) has been detected. In another example, when this reading is compared to a normal range or threshold, described above, the onboard computer will compare this blood pressure reading to another taken a predetermined time later (e.g., 5 minutes or any other time period that may be utilized to affect the intended purpose of determining if an event has been detected) and, if the measurement is still outside of a predetermined range or below/above a predetermined threshold, indicate that an event has been detected. In still another example, the on-board computer will use the elevated reading and wait for another confirming measurement, such as chest pain (to be entered using a display 210 or using a display 254 on an ADV wearable occupant sensor device 250), shortness of breath, back pain (to be entered using a display 210 or using a display 254 on an ADV wearable occupant sensor device 250), difficulty speaking (to be monitored using a microphone (not shown) communicatively connected to the on-board computer), change in vision (to be entered using a display 210 or using a display 254 on an ADV wearable occupant sensor device 250), or any other one or more symptoms that accompany a heart attack. An event (e.g., shock, bradycardia, heart attack, heart failure, etc.) may also be triggered if a relevant ADV occupant's blood pressure is too low.

For example, if an ADV occupant does not have diabetes, historical data and calibration data can indicate that, for one or more ADV occupants, a fasting blood sugar level in the morning should be under 100 mg/dl, a blood sugar level before a meal should measure between 70-99 mg/dl, and a blood sugar level taken 2 hours after a meal (i.e., Postprandial) should have a measurement of less than 140 mg/dl. In one example, if an on-board computer determines, using one or more occupant sensors 208, that a relevant ADV occupant's blood sugar levels plummet to dangerous levels such that hypoglycemia is present, the on-board computer can determine that an event has been detected (i.e., hypoglycemia). In another example, if an on-board computer determines, using one or more occupant sensors 208, that a relevant ADV occupant's blood sugar levels have spiked above 400 mg/d (22.2 mmol/L), the on-board computer can determine that an event (e.g., Hyperglycemia, Hyperosmolar hyperglycemic state (HHS), or Diabetic ketoacidosis (DKA)) has been detected. In this example, one or more sensors 208 that can be utilized to measure blood sugar levels may be configured as a patch. For example, a Free-Style Libre™ by Abbott may be utilized. In another example, a sensor that uses one or more of an ADV occupant's fluids (e.g., sweat, tears, saliva, blood, etc.) can be utilized to measure blood sugar and/or or glucose levels. One or more sensors that utilize light reflection, refraction and/or other light properties may be utilized to measure blood sugar and/or glucose levels.

Figure 4:
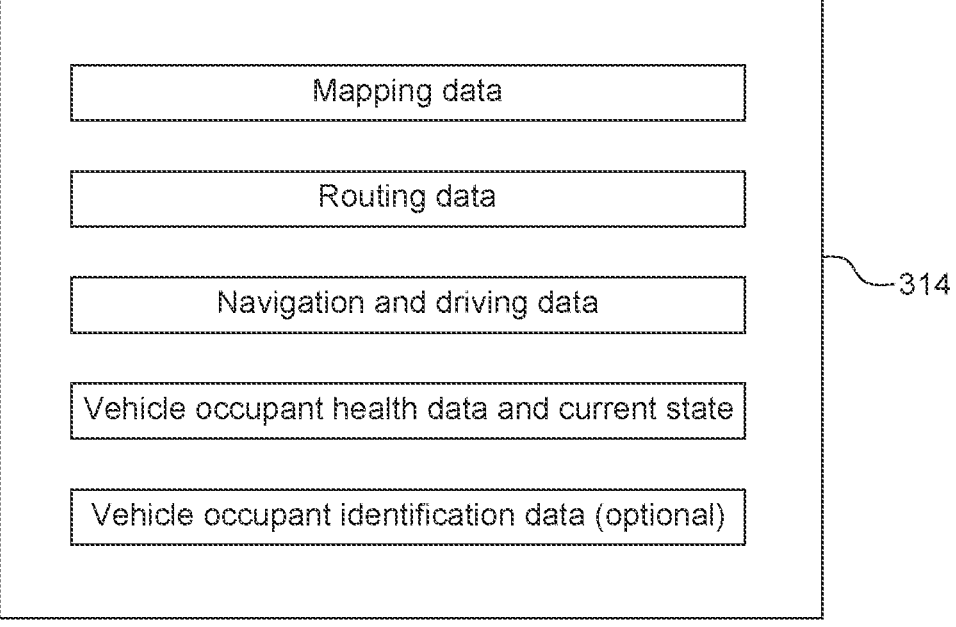
FIG. 4 is a diagram depicting an example of a memory architecture for an ADV control system and on-board computer, according to some embodiments.

As described in FIG. 4, data storage device 314 is utilized by on-board computer 204 to retrievably store all of the sensor data generated by one or more ADV sensor including, for example, occupant sensors 208, navigation and control sensors 218, ADV reference sensors 216, and any other data generated by any sensor, module, device, system, etc. that is utilized by on-board computer 204 to effectively and safely navigate ADV 602 as described herein. Although not illustrated, in one or more embodiments, data storage device 314 also stores the operating system for on-board computer 204, and one or more systems utilized by on-board computer 204 to perform the respective functionalities described herein, systems including the ADV reference system 304, navigation and driving mode system 306, dynamic routing system 308, mapping system 310, occupant health monitoring system 312, and or occupant identification system 320. Data storage device 314 is also configured to retrievably store mapping information associated with relevant geographical areas with which and within which the routing information (e.g., ADV geographical staring location(s) and geographical destination(s)) described herein is associated and geographically resides. In one or more embodiments, data storage device 314 may include one or more databases and/or have access to one or more databases (e.g., Microsoft SQL Server, MySQL, Oracle, relational database(s), multi-dimensional database(s), DB$_2$, OLAP cube database(s), multidimensional online analytical processing (MOLAP), etc.).

As described herein, one or more embodiments of the on-board computer 204 includes an in-memory processing system configured to perform in-memory processing utilizing one or more processors and one or more RAM devices (not shown) to store all of the relevant data required to navigate the ADV and perform all of the functionality associated with on-board computer 204 described herein. In another embodiment, the entire contents of the data storage device 314 are retrievably stored in one or more RAM devices for efficient accessibility by the CPU 302. In one or more embodiments, CPU 302 can be one or more processors. In this example, one or more copies of all of the data stored in one more RAM devices are also stored in data storage device 314. The storage device 314 can be, for example, a non-volatile memory, read only memory (ROM), a flash memory, NAND flash memory and the like, or a magnetic disk device, such as a hard disk drive (HDD), and the like. For example, the in-memory processing system can store all of the mapping information for one or more relevant geographical areas such that the CPU 302 can generate routes without having to access the data storage device 314. For example, the in-memory processing system can store all of the health data generated by occupant sensors 208 such that the CPU can process and analyze the occupant's state of health and/or physiological to detect an event without having to retrieve data from storage system 314. In one or more embodiments, the data generated by navigation and control sensors 218 and ADV reference sensors 216 are also stored and processed by the in-memory processing system such that the relevant data does not have to be retrieved from data storage system 314.

Figure 5:
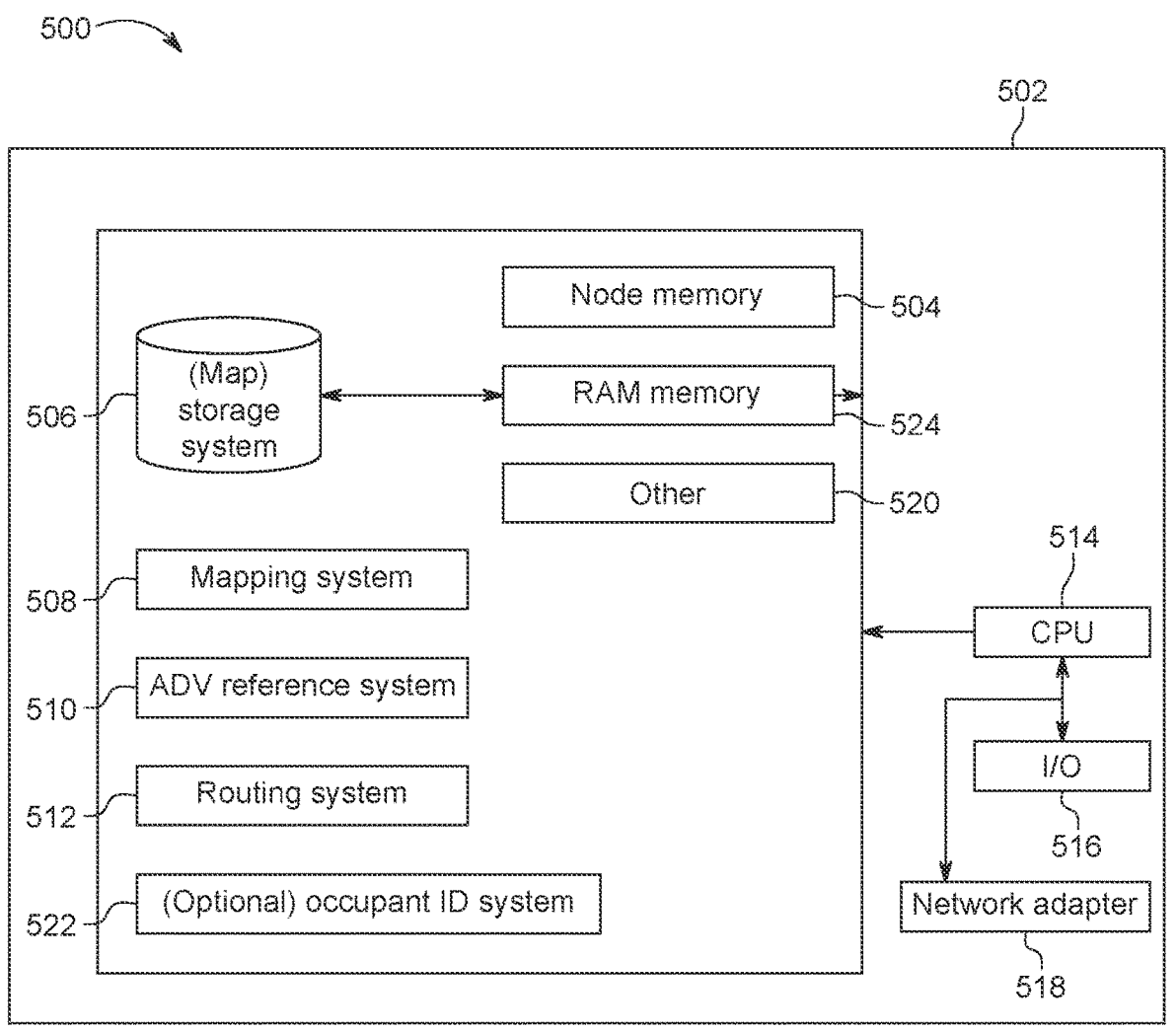
FIG. 5 is a diagram depicting an example of an architecture for an ADV control system computer node, according to some embodiments.
Figure 6B:
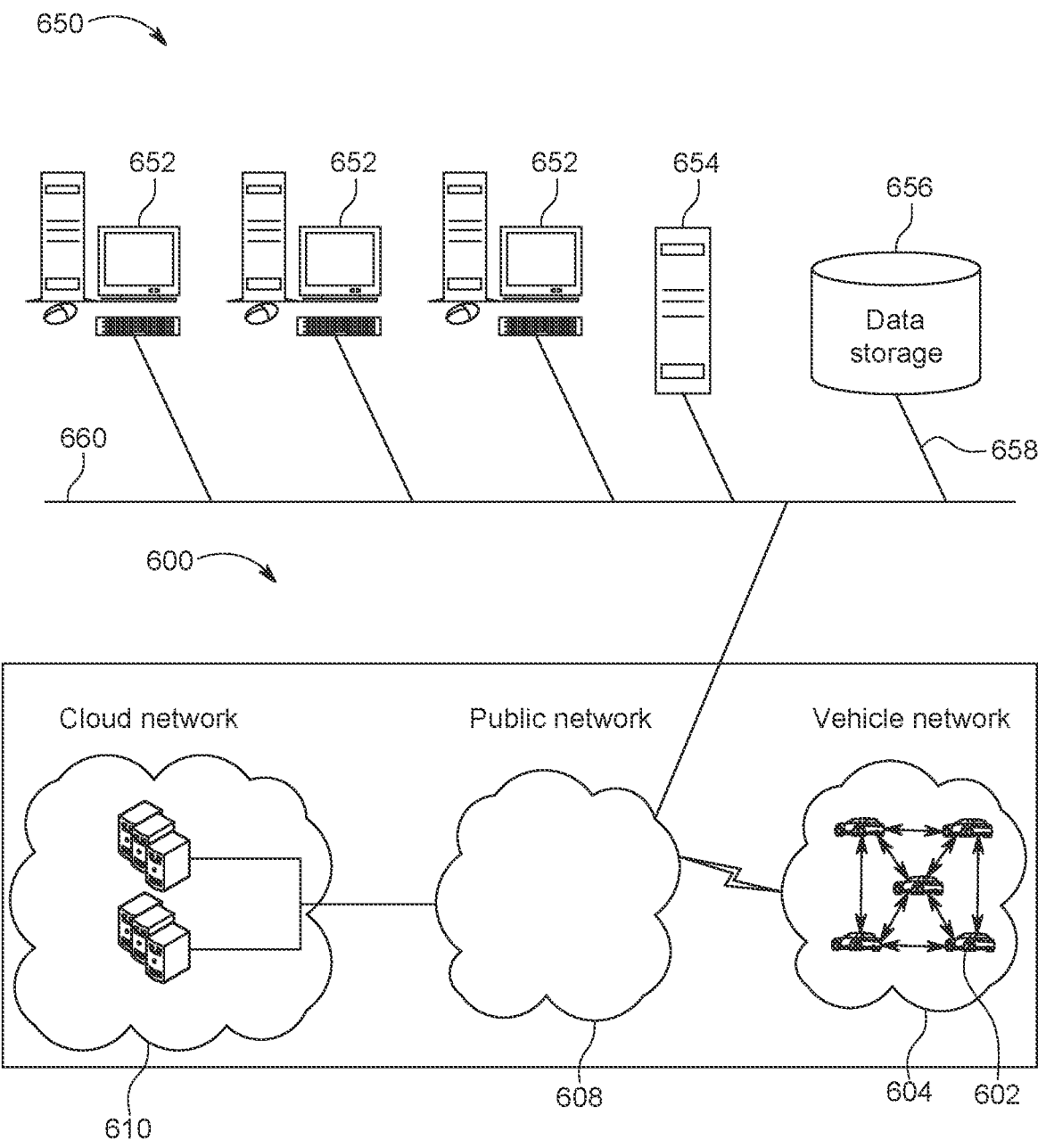
FIG. 6B is a diagram depicting an example of an ADV control system network platform capable of communications with one or more health facilities, according to some embodiments.

ADV control system nodes 502, as described with reference to FIGS. 5, 6A and 6B, are configured as an ADV control system network 610 which is part of an ADV control network platform 600. One more control system nodes 502 that reside in ADV control system network 610 can be utilized by an on-board computer 204 by one or more ADV vehicles to navigate the relevant ADV in various ways including, for example, generating mapping and routing information, assisting in monitoring one or more ADV occupants, and facilitating communications with one or more healthcare facilities as described herein reference to FIGS. 5 and 6B. As described with respect to FIGS. 6A and 6B, one or more ADV control system nodes 502 may be configured in a ADV network service platform 600 and configured as a cloud network and/or mapped to a cloud network 610. The cloud network can be protected such that only authorized users (e.g., computer devices and/or persons given authorization) can access the network. The network 610 can also be protected by a firewall that assists in preventing unauthorized access.

In one embodiment, mapping system 508, ADV reference system 510, routing system 512 and ADV occupant identification system 522 reside in node memory data storage 504 and can be configured, for example, as software, software applications, executable instructions to be executed by CPU 514, etc. In one or more embodiments, CPU 514 can be one or more processors. In one embodiment, storage system 506 included with ADV control system node 502 may also include one or more one or more databases and/or have access to one or more databases (e.g., SQL server, MySQL, Oracle, etc.) that store mapping information concerning geographical areas of various sizes (e.g., areas that span less than a mile to areas that span over a thousand miles), such as, for example, large geographical areas, such as the United States, states within the U.S., foreign countries and other large areas such as the European Continent (e.g., geographical area that includes navigable pathways that are accessible by car). The map system 508 can retrieve mapping information from storage device 506 to generate one or more maps that include the relevant geographical areas of one or more routes generated by routing system 512 that may be utilized by one or more ADVs 602 to reach one or more predetermined destinations. The mapping information also includes geographical information and associated address information for structures (e.g., houses, businesses, healthcare facilities, etc.) and points of interest (i.e., tollways, bridges, airports, amusement parks, etc.). The on-board computers 204 that reside in the ADVs are also configured to receive mapping information and routing information from one or more nodes 502 that reside in the ADV network 610 and utilize this information to navigate the relevant ADV. In some embodiments, the ADV control and system node 502 may reside on one or more (in the case of multiple nodes) application servers (not shown), and/or in a cloud network. Other configurations are within the scope of the present disclosure. With the aid of on-board computer 204, one or more nodes 502 may transmit one or a series (i.e., one or more) of navigable routes from the ADV's current position to one or a series of predetermined destinations that may be utilized by one or more on-board computers 204 residing in one or more ADVs 602 in each of their mapping, route generation and navigating activities described herein with reference to FIGS. 7-10. Each of the routes generated and/or obtained along with any information associated with each of the routes and/or navigable pathways included in any one of the routes may be stored in map storage database 506 for retrieval by the mapping system 508, ADV reference system 510, routing system 512 and/or occupant ID system 522 for use in assisting one or more ADVs.

In one embodiment, one or more nodes 502 that reside in ADV control network 610 may use social networking to build and update mapping information and routing information utilized to generate navigational routes as described herein. For example, users may communicate with one or more nodes 502 and other components of the ADV control network platform 600 (e.g., ADVs 602) using mobile devices 606 over a network 608. Examples of mobile devises 606 include, but are not limited to, mobile phones (e.g., a smartphones or feature phones), personal digital assistants, and tablet computers and other types of mobile devices 606 are within the scope of the present disclosure. Mobile devices 606 can communicate with the ADV control network platform 600 via a communication network 608. Examples of mobile devices 606 that may be used to communicate data and information concerning the navigation of one or more ADVs over a network 608 include a laptop computer, a tablet computer (e.g., an iPad), a mobile or smart phone (e.g., an iPhone), a smartwatch (e.g., a Pebble E-Paper Watch), an augmented reality head-mounted display (e.g., Google Glass), and so on. In one or more other embodiments, each ADV included in the fleet of ADVs can communicate with the ADV control network platform 600 via a communication network 608 to transmit information to one or more nodes 502 residing in the ADV network 610 such that the information can be utilized and/or transmitted to one or more ADVs in an ADV fleet. The information transmitted by mobile devices 606 and/or ADVs 602 can include, for example, information concerning one or more navigable pathways, geographical location information of geographical artifacts, current and/or average speed of a length of a navigable pathway, temperature, road hazards, traffic congestion information, traffic pattern information, detours, travel times of a navigable pathway or length of a navigable pathway, travel time to navigate a generated route, GPS and reference positioning data of the vehicle, inclination angles of a navigable pathway or length of navigable pathway, angles of curvature of a navigable pathway or length of navigable pathway, or any information about a navigable pathway or a length thereof, the surrounding geographical area, environmental conditions and/or information concerning the ADV itself that can be sensed and/or determined by an ADV on-board computer.

As described herein, if an on-board computer 204 does not have enough mapping information to generate a route from its current geographical position to an identified destination, either because the mapping information does not contain the current position of the ADV, the identified destination of the ADV, or one or more navigable pathways that are between the aforementioned current position and the identified destination, the on-board computer 204 may transmit a request to one or more ADV control system nodes 502 that reside in the ADV control network 610 to receive the required mapping information. For example, the on-board computer 204 may utilize the mapping system 310, the dynamic routing system 308 and the ADV reference system 304 to use the transmitted information to generate the current geographical position of the ADV, the identified geographical destination, and one or more routes to navigate the ADV along to reach the destination. In some embodiments, one or more ADV control system nodes 502 will determine the current position of the ADV, the identified geographical destination of the ADV, one or more navigable pathways that are between the aforementioned current position and the identified destination, and generate one or more routes for the ADV to reach the destination and transmit the same to the on-board computer 204 for either use by and/or confirmation of the on-board computer 204 generated information. In one embodiment, an ADV occupant or another user of the ADV system may enter a destination using a GUI on display 210, provide a destination using one or more mobile devices 606, or use a computer to transmit information to the ADV system network 610 that includes scheduling information (e.g., time, date, etc.), destination information (address, etc.), and occupant ID information (name, age, address, etc.). This information may be utilized by one or more nodes 502 in the ADV network 610 to transmit, to the relevant ADV, routing information, mapping information that includes a geographical region that further includes a generated route, and/or the geographical locations of the scheduled starting point or current location of the ADV.

The ADV control system utilizing one or more control nodes 502 may determine the current positon and/or a starting position of an ADV to assist in the generation of routing information in a similar manner as described with the on-board computer 204 herein. For example, the ADV network may utilize an ADV reference system 510, shown in FIG. 5, included within one or more control system nodes 502 to determine the location of the ADV on the Earth and, ultimately, on a map. For example, ADV reference system 510 can use a global-positioning system (GPS), the Quazi-Zenith Satellite System (QZSS), Beidou, Galileo, Globalnaya Navigazionnaya Sputnikovaya Sistema or Global Navigation Satellite System (GLONASS), or any other system that is accurate enough to determine the position of an ADV within time and distance constraints such that the position may both correlate with mapping information, be continuously updated, and fall within certain positioning distances such that navigation of the vehicle can be safely achieved while maintaining the accuracy of the routing information. In another embodiment, the starting location may be transmitted via mobile devices 606, entered using a GUI included in display 210, or otherwise provided to an on-board computer 204.

As described herein, mobile devices 606 may be utilized within the ADV network platform 600 to provide information about one or more navigable pathways by transmitting the same over a public network 608 to one or more control system nodes 502 residing in the ADV network 610. For example, some of the mobile devices 606 are equipped with imaging systems such that visual information (e.g., pictures, videos) may be transmitted to one or more nodes 502 or one or more on-board computers 204 that reside in ADVs 602, or both. Utilizing the ADV reference system 508 that resides in one or nodes 502, and the ADV reference system 304 that resides within on-board computer 204, the image data may be compared with historical image data that resides in the storage system 506 and/or the data storage 314 to determine the location of the image information. Once the geographical location is determined, the information may be used to update route navigation times due to circumstances surrounding the navigable pathways (i.e., accidents, road obstructions, environmental occurrences, etc.), determine one or more of a destination or a current position, or other information that affects routing and positioning. In some instances, the image data itself will include metadata that includes positioning and other information that may be utilized in a manner to determine and generate routing, mapping and route updating information. Historical information that can be used to generate and determine information concerning positioning, routing and mapping of one or more of the ADVs is stored in storage system 506 or other databases for retrieval by one or more nodes 502 to assist one or more ADVs to navigate generated routes as described herein. With respect to FIG. 6B, one or more ADV control system nodes may be configured in a ADV network service network that can be mapped to a cloud network 610 protected by a firewall and a management network that can be mapped to a public cloud network 608.

Figure 7:
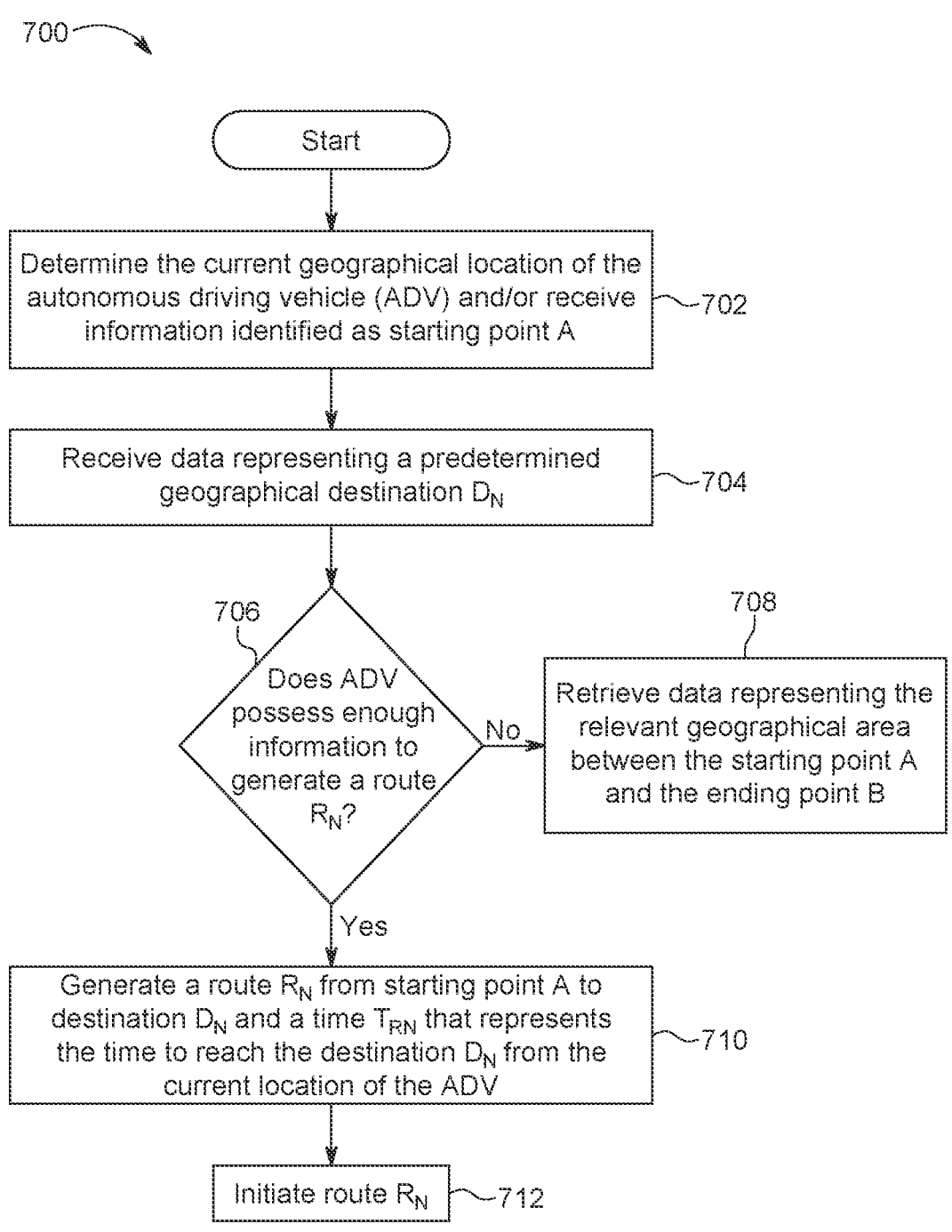
FIG. 7 is an example of a block diagram including a flow chart of one or more steps performed by one or more processors and/or other devices to route an ADV based upon sensor data, navigation data, and/or other data provided to the processor(s), according to some embodiments.

FIG. 7 is a flowchart that will be referenced to describe an algorithm for determining and generating a route $R_N$ using an ADV's current location to a predetermined destination $D_N$ and autonomously navigating the ADV along the route $R_N$ in accordance with one embodiment. At step 702, the current geographical location of the ADV is identified. In one embodiment, the on-board computer 204 utilizing the ADV reference system 304 determines the current geographical position of an ADV using techniques described herein. In another embodiment, one or more control system nodes 502 that reside in the ADV network 610 may be utilized to determine the current geographical location of the ADV using one or more techniques described herein. In another embodiment, one or more mobile devices 606 may be utilized to determine the current geographical location of an ADV using one or more techniques described herein.

At step 704, the on-board computer 204 receives data representing the predetermined destination $D_N$ that represents an ending point B and determines the associated geographical location of destination $D_N$ on a map using mapping information generated for a relevant geographical area. As described herein, the destination $D_N$ may be selected by an ADV occupant or third-party, transmitted to one or more nodes 502 using a mobile device or desktop computer and, thereafter, transmitted to the relevant ADV, entered into a display 210 by an ADV occupant, transmitted using one or control and system nodes 502 over a network 608 to on-board computer 204, and/or otherwise selected.

At step 706, the onboard computer 204 utilizing the mapping system 310 and the data storage 314 determines, utilizing dynamic routing system 308, if there is enough information to generate a route $R_N$ from the starting point A to the predetermined destination $D_N$. As described herein, the mapping information is used to assist in the determination of the navigational pathways from the starting point A to the destination $D_N$ so that a time $T_{RN}$ that represents the time that it will take the ADV to autonomously navigate the ADV along the navigational pathways from the starting point to the destination $D_N$. Knowing the geographical positions of all of the navigational pathways between starting point A to the predetermined destination $D_N$ allows the on-board computer 204 and/or one or more nodes 502 residing in the ADV network 610 to analyze historical data and/or data transmitted in real time to determine if one or more occurrences (e.g., traffic, accident, environmental hazard, draw bridge activity, tollways, road work, etc.) will impede the ADV from navigating one or more pathways included in the current route $R_N$ to reach a destination $D_N$ and thus impact the time $T_{RN}$. Additionally, analyzing each of the navigable pathways, with respect to the current positon of the car, the current direction of the ADV and/or the direction the ADV is traveling along a navigable pathway, allows for a more reliable calculation of the time $T_{RN}$. If the on-board computer 204 determines that there is not enough information at step 706, as described with reference to step 708, the on-board computer 204 transmits a request to one or more control and system nodes 502 in the ADV network to either 1) receive the necessary information to generate the mapping information and/or the route $R_N$, 2) receive both the mapping information and the route $R_N$, or 3) receive both 1) and 2) and use the information from 2) to confirm the mapping and/or route information generated in 1).

If the on-board computer 204 determines that there is enough information at step 706, the on-board computer 204 utilizes the dynamic routing system 308 to generate a route $R_N$ and a time $T_{RN}$ at step 710 and automatically initiates the route at step 712 to autonomously navigate the ADV to the destination $D_N$ from the ADV's current position.

In one embodiment, an on-board computer 204 and/or one or more of the system control nodes are programmed via the dynamic routing system 308 in case of the on-board computer 204 or the routing system 512 in case of the one or more control nodes to execute a dynamic routing algorithm that utilizes artificial intelligence to continuously generate the shortest temporal route from the ADV's current position to a predetermined destination $D_N$ based upon information concerning the navigable pathways in the relevant geographical region. The dynamic algorithm will now be described with reference to FIG. 8. which represents a flow chart of the algorithm. According to one embodiment, an ADV on-board computer 204 and/or one or more system control nodes 502 are programmed to utilize a dynamic routing algorithm to perform dynamic routing using artificial intelligence (AI) to generate and determine the shortest temporal route that an ADV will navigate from a geographical starting point (e.g., the current location of the ADV or another predetermined geographical location) to a geographical ending point (e.g., a predetermined destination $D_N$ or another predetermined geographical location). Depending upon the size of a geographical region to be traversed and the amount of information gathered concerning the navigable pathways within the geographical region collected, either a single ADV can perform dynamic routing using artificial intelligence (AI) to generate a route $R_{N+1}$, or an ADV system network 610 that utilizes one or more ADV control system nodes 502 can be utilized by an on-board ADV computer to perform dynamic routing using artificial intelligence (AI) to generate a new route $R_{N+1}$.

For example, if the on-board computer 204 determines that the mapping information stored in the data storage and generated utilizing the mapping system does not contain any one or more parts of the new route $R_{N+1}$, the on-board computer 204 can communicatively couple to one or more control system nodes 502 included in the ADV system network 610 and receive the required mapping information to generate a new route $R_{N+1}$ and perform the dynamic routing algorithm. The dynamic routing algorithm is initialized utilizing the dynamic routing system 308 concurrently with the generation or the receipt of a route $R_N$ or at any point during the navigation of the route $R_N$ by the ADV. As described herein with reference to step 802, the on-board computer 204 determines the current geographical location of the ADV and the total time $T_{RN}$ that it will take from the ADV's current geographical location to reach the current predetermined location $D_N$. As described with reference to step 804, the on-board computer 204 uses the reference system, the dynamic routing system 308 and the mapping system 310 and analyzes 1) the mapping information generated by the mapping system, 2) data and/or other information transmitted to the on-board computer 204 over a network, 3) historical data stored in the on-board computer 204 data storage device 314 and/or the data storage 506 of one or more control system nodes 502 transmitted to the on-board computer 204, if available, to generate a number of alternative navigable routes $R_A$ from the ADV's current position to the predetermined destination $D_N$.

For example, in one embodiment the on-board computer 204 uses the mapping system and the ADV reference system to automatically generate a set number of alternative routes $R_A$ in addition to the current route $R_N$ when the route RN is initially generated. The routes $R_A$ may be generated based upon a weighted system that utilizes time, distance and/or navigable pathway conditions.

For example, in one embodiment, using the total navigable distance associated with a current route $R_N$ measured from the ADV's current position on the route $R_N$ to the current predetermined destination $D_N$, the on-board computer 204 utilizing the dynamic routing system 308 can also generate a number (e.g., ≤N (which can be any number depending upon the number of routes available and the available system processing resources)) of alternative routes $R_A$ that are within (higher and lower) a navigable distance (e.g., ≤N≥(which can be a % of the reference navigable distance or some other number)) of the reference navigable distance (defined by the distance from the current location of the ADV to the predetermined geographical destination $D_N$).

Another embodiment generates a number of alternative routes $R_A$ an ADV can navigate from the ADV's current position to the predetermined destination $D_N$ as described in step 804 by using a weighting system that uses historical data that includes the average times required to traverse one or more known previously stored routes that align with or most closely align with the current route $R_N$. In this example, as described herein with reference to step 802, each route $R_N$ generated or received by the on-board computer 204 or by one or more control system nodes 502 has a total time value $T_{RN}$ associated therewith that is a temporal measure based upon the total distance of the route $R_N$ and/or other information (e.g., current speed of the ADV, known average speed of vehicles one on or more navigable pathways within the route, historical information concerning time(s) to traverse the entire route or one or more navigable pathways included therein, speed limit of one or more navigable pathways within the route, roadway obstructions, accidents, conditions of one or more navigable pathways within the route, time of day, day of the week, or any information that can be used to determine the time to traverse the route $R_N$—e.g., navigable pathway information). For example, the time $T_{RN}$ for the route $R_N$ is continuously updated in the manner described herein and saved as the ADV navigates current route $R_N$ such that the $T_{RN}$ represents a current estimated temporal measure of the total time it will take the ADV to reach the current destination $D_N$ from the ADV's current position based upon the information described herein. In one embodiment, as described with respect to step 804, for each route $R_N$ received or generated, a series of historical routes $R_H$ are automatically generated based upon certain criteria. For example, historical routes $R_H$ that match or most closely match the route $R_N$ are selected by comparing the total time value $T_{RN}$ with a total time value $T_{RH}$ (total time to traverse a relevant historical route from the current geographical position of the ADV) that is similarly associated with each $R_H$ and determined in one or more ways consistent with that of time $T_{RN}$. In one embodiment, the on-board computer 204 and/or one or more control system nodes 502 determines if the time $T_{RH}$ is within a predetermined temporal range of time $T_{RN}$. For example, the temporal range may be any range (higher or lower) (e.g., $\leq T_{RN} \geq$ (which can be a % of the reference navigable time $T_{RN}$ or some other number)) as long as it is suitable to identify a number of relevant historical routes $R_H$ for the purpose described herein. Each historical route $R_H$ is selected from a repository of historically saved routes either stored in the data storage 314 included in an on-board computer 204 and/or in the storage system 506 of one or more control system nodes 502. As above, if the on-board computer 204 determines that the mapping information stored in the data storage 314 and generated utilizing the mapping system 310 does not contain any one or more navigable pathways included in a historical route $R_H$ or an alternative route $R_A$, the on-board computer 204 can communicatively couple to one or more control system nodes 502 included in the ADV system network 610 and receive the required mapping information to generate a historical route $R_H$ or an alternative route $R_A$ and perform the dynamic routing algorithm. If one or more historical routes $R_H$ are stored on one or more control system nodes 502, the historical routes $R_H$ may be transmitted to the on-board computer 204 for processing. Once a set of one or more historical routes has been determined using one or more techniques described herein and/or other known techniques, each historical route $R_H$ will be added to the list of alternative routes $R_A$ and associated with a current route $R_N$. In one embodiment, for each route $R_A$, a total time value $T_{RA}$ that represents the total time to traverse the route $R_A$ from the current geographical position of the ADV that is similarly determined for the current route $R_N$ in one or more ways described herein is currently updated and saved by the on-board computer 204 and/or the one or more control system nodes 502. In this manner, if $T_{RA}$ for one or more of the alternative routes $R_A$ is determined to be out of the range of acceptable temporal values, those one or more offending routes $R_A$ will be discarded from the set of alternative routes RA.

In one embodiment, the on-board computer 204 can also rely upon information and data transmitted by one or more mobile devices 606 that are connected to the ADV system platform 600 over a network 608 to calculate, update and/or obtain information that may impact the total time value $T_{RH}$ of one or more historical routes $R_H$, total time value $T_A$ of one or more alternative routes $R_A$ and/or obtain information that may be utilized to calculate and/or update the $T_{RN}$ for a route $R_N$ upon which an ADV is currently navigating. Information that can be transmitted by one or more mobile devices 606 includes, for example, average speed of vehicles on one or more navigable pathways that are included within one or more of the routes $R_N$, $R_H$ and/or $R_A$, historical information concerning time(s) to traverse the entirety of one or more of the routes $R_N$, $R_H$ and/or $R_A$ or one or more navigable pathways included within any one or more of the routes $R_{N+1}$, $R_H$ and/or $R_A$, speed limit of one or more navigable pathways within any one or more of the routes $R_{N+1}$, $R_H$ and/or $R_A$, roadway obstructions, accidents, conditions of one or more navigable pathways within any one or more of the routes $R_N$, $R_H$ and/or $R_A$, time of day, day of the week, or any information that can be used to determine and/or update the measurements of the times $T_{RA}$, $T_H$ and/or $T_{RN}$ to traverse the routes $R_A$, $R_H$ and/or $R_N$. In this example, that will be described with reference to FIG. 6, the mobile devices 606 will connect to one or more control system nodes 502 over a network 608 and transmit information to the one or more nodes using ADV system platform 600. An on-board computer 204 can communicatively connect to one or more control system nodes 502 over a network 608 such that the relevant information can be transmitted from one or more nodes 502 residing in the network 610 to an on-board computer 204. In this embodiment, users of mobile devices 606 that are connected to the ADV system network 610 via a network 608 can transmit information concerning any of the navigable pathways included in the routes $R_A$, $R_H$ and/or $R_N$.

As described in step 806, after the set of alternative routes $R_A$ has been determined with respect to step 804, each alternative route $R_A$ included in the set of alternative routes $R_A$ is analyzed to determine if any pre-determined restrictions will cause one or more alternative routes $R_A$ to be discarded from the set of available alternative routes $R_A$. For example, once the set of routes $R_A$ have been generated, the on-board computer 204 can take into account any rules or predetermined conditions that must be met to select one of the routes in the set $R_A$ as the new current route $R_{N+1}$. The on-board computer 204 is programmed to select the shortest temporal pathway R Q from the set of alternative routes $R_A$ that meet one or more predetermined conditions, wherein R Q represents the route that will take the shortest amount of time for the ADV to traverse from the ADV's current position to the predetermined destination DN (the shortest temporal route) determined from the set of qualifying alternative routes $R_A$. As described in step 806, these predetermined conditions may include conditions that are associated with 1) roadway conditions that exists on one or more navigable pathways included in a relevant $R_A$, 2) tollways or other monetary entities that condition travel on some sort of payment system that that exists on one or more navigable pathways included in a relevant $R_A$, 3) environmental conditions that exists on one or more navigable pathways included in a relevant $R_A$, 4) accidents or other obstructions that exists on one or more navigable pathways included in a relevant $R_A$, or 5) any other condition or occurrence that exists on one or more navigable pathways included in a relevant $R_A$ that will impede an efficient and/or expedient form of travel. In one embodiment, as described with reference to step 806, the on-board computer 204 is programmed to select alternative routes $R_A$ that avoid certain geographical artifacts that are found along the navigable pathways and/or the relevant geographical region, artifacts including, for example, one or more of city streets, tolls, lights, bridges, highways, street cameras, structures, identified accidents or traffic jams, locations, etc. that may exists and are identifiable geographically within the relevant geographical area that includes one or more navigable pathways included in the set of alternative routes $R_A$. According to step 806, for any alternative routes RA that do not meet any one or more of the predetermined conditions described herein with reference to step 806, the on-board computer 204 will discard the one or more alternative routes from the set of alternative routes $R_A$ to determine of the set $R_Q$ of qualifying alternative routes $R_Q$.

Once the on-board computer 204 has identified the set of qualifying alternative routes $R_Q$, the on-board computer 204 determines the time $T_{RQ}$ for each qualifying route $R_Q$, wherein $T_{RQ}$ for each route $R_Q$ represents the total time to traverse the route $R_Q$ from the current geographical position of the ADV as described in step 808. The time $T_{RQ}$ for each qualifying route $R_Q$ is determined in a manner similar to that of $T_{RN}$ determined for the current route $R_N$ and/or in one or more ways described herein. Once the set of qualifying routes $R_Q$ is determined, the time $T_{RQ}$ for each qualifying route $R_Q$ is continuously updated and saved by the on-board computer 204 and/or the one or more control system nodes 502. With respect to step 808, in response to on-board determining the time $T_{RQ}$ for each qualifying route $R_Q$, the on-board computer 204 determines the current location of the ADV and, with respect to the current location, determines which time $T_{RQ}$ for each of the qualifying routes $R_Q$ represents the shortest time, and sets the qualifying route that is associated with the shortest $T_{RQ}$ as route $R_{Qt}$. In this example, route $R_{Qt}$ represents the shortest temporal path of all of the qualifying routes $R_Q$ in the set of qualifying routes $R_Q$ from the current position of the ADV to the predetermined destination $D_N$. As described in step 808, the on-board computer 204 determines the time $T_{Qt}$ for shortest temporal path route $R_{Qt}$, wherein $T_{Qt}$ for the route $R_{Qt}$ represents the total time to traverse the shortest temporal path $R_{Qt}$ from the current geographical position of the ADV to the predetermined destination $D_N$. The time $T_{Qt}$ for the shortest temporal path $R_{Qt}$ is continuously updated and saved by the on-board computer 204 and/or the one or more control system nodes 502.

As described in step 810, in response to the on-board computer 204 determining the time $T_{Qt}$ for the shortest temporal path $R_{Qt}$, the time $T_{Qt}$ for the shortest temporal path $R_{Qt}$ is compared to the time $T_{RN}$ for the current route $R_N$. If the time $T_{Qt}$ for the current geographical position of the ADV is less than the time $T_{RN}$ for the current route $R_N$, then the on-board computer 204 will set the route $R_{Qt}$ as the new route $R_{N+1}$ and automatically reroute the ADV to autonomously navigate the new route $R_{N+1}$ as described herein. Once the new route $R_{N+1}$ is set, the dynamic routing algorithm will recycle back to step 802, set $R_N=R_{N+1}$ and continuously cycle through the dynamic routing algorithm that utilizes artificial intelligence to automatically navigate the ADV as described herein until the ADV reaches its predetermined destination $D_N$. For example, in response to $R_N$ being updated to $R_{N+1}$, the on-board computer 204 will determine the time $T_{RN+1}$ for new route $R_{N+1}$, wherein time $T_{RN+1}$ represents the total time to traverse the route $R_{N+1}$ from the current geographical position of the ADV, as described in step 802. Thereafter, the dynamic routing algorithm will use artificial intelligence as described herein to automatically navigate the ADV by continuously generating alternative routes $R_A$ in real-time, determine if any of those alternative routes represent a shorter temporal route to the current route the ADV is autonomously navigating, and automatically redirect the autonomous vehicle to navigate another alternative route (e.g., new route $R_{N+2}$ if the preceding route was route $R_{N+1}$ and the current destination was $D_N$) if the new route meets predetermined conditions and is a shorter temporal route than the current route the ADV is navigating.

For example, as described in step 812, if the time $T_{Qt}$ for the current geographical position of the ADV is equal to or more than the time $T_{RN}$ for the current route $R_N$, then the on-board computer 204 will discard route $R_{QT}$, go back to step 804 and autonomously navigate the ADV along the current route $R_N$ while continuously cycling through the dynamic routing algorithm to generate alternative routes and determine if an alternative route meets the predetermined conditions and is a shorter temporal route than the current route the ADV is navigating until the ADV reaches its predetermined destination $D_N$, as described herein. In the above embodiments, the on-board computer 204, one or more control system nodes 502 or a combination of both utilizing the dynamic routing system 308 and/or the routing system 512, respectively, can perform the dynamic routing algorithm that utilizes artificial intelligence to automatically navigate an ADV in real time as described herein.

In one or more embodiments, either the on-board computer 204 or one or more nodes 502 utilizing the dynamic routing system 308 and/or the routing system 512, respectively, will generate the set of alternative routes $R_A$. For example, if an ADV is required to navigate road A, road B, road C and road D from its current position to reach a predetermined destination $D_N$, then the ADV on-board computer 204 will monitor its data storage 314 and/or the storage system 506 of one or more control system nodes 502 to determine if there is any current and relevant information concerning road A, road B, road C and/or road D that will impact the navigable time $T_{RN}$. If there exists an event that will impact the navigable time $T_{RN}$ for the current route, either the on-board computer 204 or one or more nodes 502 will generate a new navigable time $T_{RN+1}$ that will take the event into account. Similarly, if an alternative route $R_A$ or a historical route $R_H$ includes road G, road H, road I, and road J which represent navigable pathways that an ADV can navigate to reach the current destination $D_N$ from its current geographical position along one or more alternative routes, the ADV on-board computer 204 will monitor its data storage and/or the storage system 506 of one or more control system nodes 502 to determine if there is any current and relevant information concerning road G, road H, road I, and/or road J that will impact the navigable time $T_{RA}$ or $T_{RH}$ and update the same on the on-board computer 204. In this example, the on-board computer 204 can determine if the information received from devices on the ADV system platform 600 or the data storage system included in one or more control system nodes 502 is current using a time/date stamp (e.g., time of storing, receipt, transmittal, capture, etc.) associated with the information. For example, the on-board computer 204 can determine if a time/date stamp associated with the information is within a predetermined time range X from the current time. For example, the on-board computer 204 can determine if the information is relevant and if the information impacts a time required to traverse one or more roads A-D or an event that affects one or more measured times $T_{RN}$, $T_{RH}$, $T_{RA}$, $T_Q$ and or $T_{Qt}$, as described herein using the dynamic routing algorithm described with respect to FIG. 8 herein.

The on-board computer 204, utilizing the dynamic routing system 308, mapping system 310 and the positioning system 304 can re-route an ADV from its current geographical position on the current route $R_N$ to a newly determined geographical destination included in the new route $R_{N+1}$ by executing the dynamic re-routing algorithm described with reference to the flowchart illustrated in FIG. 9. Similarly to the routing algorithm described with reference to the flowchart illustrated in FIG. 8, the dynamic algorithm described with reference to FIG. 9 utilizes artificial intelligence to enable an on-board computer 204 to perform dynamic re-routing to, while the ADV is traversing the current route $R_N$, generate a new route $R_{N+1}$ and automatically re-route an ADV from its current geographical position on the current route $R_N$ to a newly determined geographical destination $D_{N+1}$ included in the new route $R_{N+1}$. The on-board computer 204 and/or one or more of the system control nodes 502 are programmed via the dynamic routing system 308 in case of the on-board computer 204 or the routing system 512 in case of the one or more control nodes 502 to execute a dynamic routing algorithm that utilizes artificial intelligence to continuously generate the shortest temporal route from the ADV's current position to a new destination $D_{N+1}$ based upon information concerning the navigable pathways in the relevant geographical region. The dynamic re-routing algorithm will now be described with reference to FIG. 9.

In this embodiment at step 902, while the ADV is autonomously navigating route $R_N$ to reach predetermined geographical destination $D_N$, the on-board computer 204 receives or generates a new destination $D_{N+1}$. Similar to the original destination $D_N$, a new destination $D_{N+1}$ can be generated or received by the on-board computer 204 which will, in turn, cause the on-board computer 204 to generate a new route $R_{N+1}$ from the ADV's current geographical position to the new geographical destination and determine the total time $T_{RN+1}$ that it will take from the ADV's current geographical location to reach the new destination $D_{N+1}$. Depending upon the size of a geographical region to be traversed from the ADV's current position to the new destination $D_{N+1}$ and the amount of relevant available information concerning the navigable pathways within the geographical region that contains the new route $R_{N+1}$, either a single ADV on-board computer 204 can perform dynamic re-routing using artificial intelligence (AI) to generate a new route $R_{N+1}$, or an ADV system network 610 that utilizes one or more ADV control system nodes 502 can be utilized by the on-board ADV computer 204 to perform dynamic routing using artificial intelligence (AI) to generate a new route $R_{N+1}$. For example, similar to the dynamic routing algorithm described above with reference to FIG. 8, if the on-board computer 204 determines that the mapping information stored in the data storage and generated utilizing the mapping system does not contain any one or more relevant parts of the new route $R_{N+1}$, the on-board computer 204 can communicatively couple to one or more control system nodes 502 included in the ADV system network 610 and receive the required mapping information to generate a new route $R_{N+1}$ and perform the dynamic re-routing algorithm. The dynamic re-routing algorithm can be initialized utilizing the dynamic routing system 308 concurrently with the generation or the receipt of a new route $R_{N+1}$ or at any point during the navigation of the route $R_N$ by the ADV when a new destination $D_{N+1}$ is generated or received. As described herein with reference to step 902, the on-board computer 204 determines the current geographical location of the ADV and the total time $T_{RN+1}$ that it will take from the ADV's current geographical location to reach the new destination $D_{N+1}$.

As described with reference to step 904, after the on-board computer 204 generates the new route $R_{N+1}$, on-board computer 204 uses the reference system, the dynamic routing system 308 and the mapping system 310 and analyzes 1) the mapping information generated by the mapping system, 2) data and/or other information transmitted to the on-board computer 204 over a network, and/or 3) historical data stored in the on-board computer 204 data storage and/or the data storage of one or more control system nodes 502 transmitted to the on-board computer 204, if available, to generate a number of alternative navigable routes $R_A$ from the ADV's current position to the new destination $D_{N+1}$. For example, in one embodiment the on-board computer 204, utilizing the dynamic routing system, may use the mapping information and the ADV reference system to automatically generate a set number of alternative routes $R_A$ in addition to the new route $R_{N+1}$ when the new route $R_{N+1}$ is initially generated. The routes $R_A$ may be generated based upon a weighted system that utilizes time, distance and/or navigable pathway conditions.

For example, in one embodiment, using the total navigable distance associated with a new route $R_{N+1}$ measured from the ADV's current position on the new route $R_{N+1}$ to the new destination $D_{N+1}$, the on-board computer 204 can also generate a number (e.g., ≤N (which can be any number depending upon the number of routes available and the available system processing resources)) of alternative routes $R_A$ that are within (higher and lower) a navigable distance (e.g., ≤N≥ (which can be a % of the reference navigable distance or some other number)) of the reference navigable distance (defined by the distance from the current location of the ADV to the new geographical destination $D_{N+1}$).

Another embodiment generates a number of alternative routes $R_A$ an ADV can navigate from the ADV's current position to the new destination $D_{N+1}$ as described in step 904 by using a weighting system that uses historical data that includes the average times required to traverse one or more known previously stored routes that align with or most closely align with the new route $R_{N+1}$. In this example, as described herein with reference to step 902, each new route $R_{N+1}$ generated utilizing dynamic routing system 308 or received by the on-board computer 204 via one or more control system nodes 502 has a total time value $T_{RN+1}$ associated therewith that is a estimated temporal measurement based upon the total distance of the new route $R_{N+1}$ and/or other information (e.g., current speed of the ADV, known average speed of vehicles one on or more navigable pathways within the route, historical information concerning time(s) to traverse the entire route or one or more navigable pathways included therein, speed limit of one or more navigable pathways within the route, roadway obstructions, accidents, conditions of one or more navigable pathways within the route, time of day, day of the week, or any information that can be used to determine the time to traverse the new route $R_{N+1}$). For example, the time $T_{RN+1}$ for the new route $R_{N+1}$ is continuously updated in the manner described herein and saved as the ADV navigates new route $R_{N+1}$ such that the time $T_{RN+1}$ represents a current temporal measure of the total time it will take the ADV to reach the new destination $D_{N+1}$ from the ADV's current position based upon the information described herein. In one embodiment, as described with respect to step 904, for each new route $R_{N+1}$ received or generated, a series of historical routes RH are automatically generated based upon certain criteria. For example, historical routes RH that match or most closely match the new route $R_{N+1}$ are selected by comparing the total time value $T_{RN+1}$ with a total time value $T_{RH}$ (total time to traverse a relevant historical route from the current geographical position of the ADV) that is similarly associated with each RH and determined in one or more ways consistent with that of $T_{RN+1}$. In one embodiment, the on-board computer 204 and/or one or more control system nodes 502 determines if the $T_{RH}$ is within a predetermined temporal range of $T_{RN+1}$. For example, the temporal range may be any range (higher or lower) (e.g., $\leq T_{RN+1} \geq$ (which can be a % of the reference navigable time $T_{RN+1}$ or some other number)) as long as it is suitable to identify a number of relevant historical routes RH for the purpose described herein. Each historical route RH is selected from a repository of historically saved routes either stored in the data storage 314 included in an on-board computer 204 and/or in the storage system 506 of one or more control system nodes 502. As above, if the on-board computer 204 determines that the mapping information stored in the data storage 314 and generated utilizing the mapping system 310 does not contain any one or more navigable pathways included in a historical route RH or an alternative route $R_A$, the on-board computer 204 can communicatively couple to one or more control system nodes 502 included in the ADV system network 610 and receive the required mapping information to generate a historical route $R_H$ or an alternative route $R_A$ and perform the dynamic routing algorithm. If stored on one or more control system nodes 502, the historical routes $R_H$ may be transmitted to the on-board computer 204 for processing. Once a set of historical routes has been determined using one or more techniques described herein and/or other known techniques, each historical route $R_H$ will be added to the list of alternative routes $R_A$ and associated with a new route $R_{N+1}$. In one embodiment, for each route $R_A$, a total time value $T_{RA}$ that represents the total time to traverse the route $R_A$ from the current geographical position of the ADV that is similarly determined for the new route $R_{N+1}$ in one or more ways described herein is currently updated and saved by the on-board computer 204 and/or the one or more control system nodes 502. In this manner, if $T_{RA}$ for one or more of the alternative routes $R_A$ is determined to be out of the range of acceptable temporal values, those one or more offending routes $R_A$ will be discarded from the set of alternative routes $R_A$.

In one embodiment, the on-board computer 204 can also rely upon information and data transmitted by one or more mobile devices 606 that are connected to the ADV system platform 600 over a network 608 to obtain information that may impact the total time value $T_{RH}$ of one or more historical routes $R_H$, total time value $T_A$ of one or more alternative routes $R_A$ and/or obtain information that may be utilized to calculate and/or update the $T_{RN+1}$ for a new route $R_{N+1}$ upon which an ADV is currently navigating. Information that can be transmitted by one or more mobile devices

606 includes, for example, average speed information of vehicles on one or more navigable pathways that are included within one or more of the routes $R_{N+1}$, $R_H$ and/or $R_A$, historical information concerning time(s) to traverse the entirety of one or more of the routes $R_{N+1}$, RH and/or $R_A$ or one or more navigable pathways included within any one or more of the routes $R_{N+1}$, RH and/or $R_A$, speed limit information of one or more navigable pathways within any one or more of the routes $R_{N+1}$, $R_H$ and/or $R_A$, roadway obstructions, accidents, the physical and/or environmental conditions of one or more navigable pathways within any one or more of the routes $R_{N+1}$, RH and/or $R_A$, the time of day, the day of the week, or any information that can be used to determine and/or update the measurements of the times $T_A$, $T_H$ and/or $T_{RN+1}$ to traverse the routes $R_A$, $R_H$ and/or $R_{N+1}$. In this example, that will be described with reference to FIG. 6, one or more mobile devices 606 will connect to one or more control system nodes 502 over a network and transmit information to the one or more nodes 502 using ADV system network 610. An on-board computer 204 can communicatively connect to one or more control system nodes 502 over a network 608 such that the relevant information can be transmitted from one or more nodes 502 residing in the network 610 to an on-board computer 204. In this embodiment, one or more users of mobile devices 606 that are connected to the ADV system platform 600 via a network 608 can transmit information concerning any of the navigable pathways included in the routes RA, RH and/or $R_{N+1}$.

As described in step 906, after the set of alternative routes $R_A$ has been determined with respect to step 904, each alternative route $R_A$ included in the set of alternative routes $R_A$ is analyzed to determine if any pre-determined conditions will cause one or more alternative routes $R_A$ to be discarded from the set of available alternative routes $R_A$. For example, once the set of routes $R_A$ have been generated, the on-board computer 204 determines if one of the routes in the set $R_A$ will become a new route $R_{N+2}$ that an ADV will automatically navigate according to a set of rules or predetermined conditions that must be met. For example, as described in step 906, the on-board computer 204 is programmed via the dynamic routing system 308 to select the shortest temporal pathway $R_Q$ from the set of alternative routes $R_A$ that meet one or more predetermined conditions, wherein $R_Q$ represents the route that will take the shortest amount of time for the ADV to traverse from the ADV's current position to the predetermined destination $D_{N+1}$ (the shortest temporal route) determined from the set of qualifying alternative routes $R_A$. As described in step 906, these predetermined conditions may include conditions that are associated with 1) roadway conditions that exists on one or more navigable pathways included in a relevant $R_A$, 2) tollways or other monetary entities that condition travel on some sort of payment system that exists on one or more navigable pathways included in a relevant $R_A$, 3) environmental conditions that exists on one or more navigable pathways included in a relevant $R_A$, 4) accidents or other obstructions that exists on one or more navigable pathways included in a relevant $R_A$, or 5) any other condition(s) or occurrence(s) that exists on one or more navigable pathways included in a relevant $R_A$ that will impede an efficient and/or expedient form of travel. In one embodiment, as described with reference to step 906, the on-board computer 204 is programmed to select alternative routes $R_A$ that avoid certain geographical artifacts that are found along the navigable pathways and/or the relevant geographical region, artifacts including, for example, one or more of city streets, tolls, lights, bridges, highways, street cameras, structures, locations, etc. that may exists and are identifiable geographically within the relevant geographical area that includes one or more navigable pathways included in the set of alternative routes $R_A$. According to step 906, for any alternative routes $R_A$ that do not meet any one or more of the predetermined conditions described herein with reference to step 906, the on-board computer 204 will discard the one or more alternative routes from the set of alternative routes $R_A$ to determine of the set $R_Q$ of qualifying alternative routes $R_Q$.

Once the on-board computer 204 has identified the set of qualifying alternative routes $R_Q$, the on-board computer 204 determines the time $T_{RQ}$ for each qualifying route $R_Q$, wherein $T_{RQ}$ for each route $R_Q$ represents the total time to traverse the route $R_Q$ from the current geographical position of the ADV as described in step 908. The time $T_{RQ}$ for each qualifying route $R_Q$ is determined in a manner similar to that of $T_{RN+1}$ determined for the new route $R_{N+1}$ and/or in one or more ways described herein. Once the set of qualifying routes $R_Q$ is determined, the time $T_{RQ}$ for each qualifying route $R_Q$ is continuously updated and saved by the on-board computer 204 and/or the one or more control system nodes 502. With respect to step 908, in response to the on-board computer 204 determining the time $T_{RQ}$ for each qualifying route $R_Q$, the on-board computer 204 determines the current location of the ADV and, with respect to the current location, determines which time $T_{RQ}$ for each of the qualifying routes $R_Q$ represents the shortest time, and sets the qualifying route that is associated with the shortest $T_{RQ}$ as route $R_{Qt}$. In this example, route $R_{Qt}$ represents the shortest temporal path of all of the qualifying routes $R_Q$ in the set of qualifying routes $R_Q$ from the current position of the ADV to the new destination $D_{N+1}$. As described in step 908, the on-board computer 204 determines the time $T_{Qt}$ for shortest temporal path route $R_{Qt}$, wherein $T_{Qt}$ for the route $R_{Qt}$ represents the total time to traverse the shortest temporal path $R_{Qt}$ from the current geographical position of the ADV to the new destination $D_{N+1}$. The time $T_{Qt}$ for the shortest temporal path $R_{Qt}$ is continuously updated and saved by the on-board computer 204 and/or the one or more control system nodes 502.

As described in step 910, in response to the on-board computer 204 determining the time $T_{Qt}$ for the shortest temporal path $R_{Qt}$, the time $T_{Qt}$ for the shortest temporal path $R_{Qt}$ is compared to the time $T_{RN+1}$ for the new route $R_{N+1}$. If the time $T_{Qt}$ for the current geographical position of the ADV is less than the time $T_{RN+1}$ for the new route $R_{N+1}$, then the on-board computer 204 will set the route $R_{QT}$ as the new route $R_{N+2}$ and automatically re-route the ADV to autonomously navigate the new route $R_{N+2}$ as described herein. Once the new route $R_{N+2}$ is set, the dynamic routing algorithm will recycle back to step 902, set $R_{N+2}$ as the current route (e.g., $R_N$) and continuously cycle through the dynamic routing algorithm that utilizes artificial intelligence to automatically navigate the ADV as described herein until the ADV reaches the new destination $D_{N+1}$. For example, in response to $R_{N+1}$ being updated to $R_{N+2}$, the on-board computer 204 will determine the time $T_{RN+2}$ for new route $R_{N+2}$, wherein time $T_{RN+2}$ represents the total time to traverse the route $R_{N+2}$ from the current geographical position of the ADV, as described in step 902. Thereafter, the dynamic routing algorithm using artificial intelligence, as described herein, will automatically navigate the ADV by continuously generating alternative routes $R_A$ in real-time to determine if any of those generated alternative routes represent a shorter temporal route as compared to the current route the ADV is autonomously navigating, and automatically redirect the autonomous vehicle to navigate another alternative route (e.g., new route $R_{N+3}$ if the preceding route was route $R_{N+2}$ and the current destination was $D_{N+1}$) if the new route meets predetermined conditions and is a shorter temporal route than the current route the ADV is navigating.

For example, as described in step 912, if the time $T_{Qt}$ for the current geographical position of the ADV is equal to or more than the time $T_{RN+1}$ for the new route $R_{N+1}$, then the on-board computer 204 will discard route $R_{QT}$, go back to step 904 and autonomously navigate the ADV along the current route $R_{N+1}$ while continuously cycling through the dynamic routing algorithm to generate alternative routes and determine if an alternative route meets the predetermined conditions and is a shorter temporal route than the current route the ADV is navigating until the ADV reaches its new destination $D_{N+1}$, as described herein. In the above embodiments, the on-board computer 204, one or more control system nodes 502 or a combination of both can perform the dynamic re-routing algorithm that utilizes artificial intelligence to automatically navigate an ADV in real time as described herein.

In one embodiment, either the on-board computer 204 or one or more nodes 502 will generate the set of alternative routes $R_A$. For example, if an ADV is required to navigate road A, road B, road C and road D from its current position to reach a new destination $D_{N+1}$, then the ADV on-board computer 204 will monitor its data storage and/or the storage system 506 of one or more control system nodes 502 to determine if there is any current and relevant information concerning road A, road B, road C and/or road D that will impact the navigable time $T_{RN+1}$. If there exists an event that will impact the navigable time $T_{RN+1}$ for the current route, either the on-board computer 204 or one or more nodes 502 will update the navigable time $T_{RN+1}$ that will take the event into account. Similarly, if an alternative route $R_A$ or a historical route $R_H$ includes road G, road H, road I, and road J which represent navigable pathways that an ADV can navigate to reach the new destination $D_{N+1}$ from its current geographical position along one or more alternative routes, the ADV on-board computer 204 will monitor its data storage 314 and/or the storage system 506 of one or more control system nodes 502 to determine if there is any current and relevant information concerning road G, road H, road I, and/or road J that will impact the navigable time $T_{RA}$ or $T_{RH}$ and update the same on the on-board computer 204. In this example, the on-board computer 204 can determine if the information received from devices 606 on the ADV system platform 600 or the data storage system 506 included in one or more control system nodes 502 is current using a time/date stamp (e.g., time of storing, receipt, transmittal, capture, etc.) associated with the information to determine if the received information is within a predetermined time range X from the current time. For example, the on-board computer 204 can determine if the information is relevant and if the information impacts a time required to traverse one or more roads A-D or an event that affects one or more measured times $T_{RN}$, $T_{RH}$, $T_{RA}$, $T_Q$ and or $T_{Qt}$, as described herein using the dynamic re-routing algorithm described with respect to FIG. 9 herein.

One or more embodiments can use one or more algorithms described herein to automatically change the current destination to a new destination $D_{N+1}$ and autonomously re-route an ADV 602 to the new geographical destination $D_{N+1}$ that includes a healthcare facility 650 based upon a health condition of one or more of an ADV's occupants. In one embodiment, the data storage 314, included in an ADV on-board computer 204 and/or the storage system 506 included in one or more control system nodes 502 of the ADV network that is communicatively coupled to the ADV on-board computer 204 over a network 608, stores mapping information of a relevant geographical area that includes the current route of an ADV. In this embodiment, the mapping information can be utilized by the on-board computer 204 and/or one or more control system nodes 502 to determine the geographical location of one or more healthcare facilities 650 within a predetermined geographical range of the current geographical position of an ADV.

One embodiment, as described herein and with reference to FIGS. 6B, and 10A through 10D, utilizes one or more processors 302 (on-board computer) and/or 514 (control system nodes) and/or other hardware to execute a dynamic routing algorithm that utilizes artificial intelligence to dynamically alter a planned or current route of an ADV and re-route the ADV to a healthcare facility 50 based on one or more real-time events associated with one or more occupants of an ADV. In this embodiment, an on-board computer 204, utilizing the dynamic routing system 308, mapping system 310, occupant health and monitoring system 312 and the reference positioning system 304 can automatically re-route an ADV from its current geographical position on the current route $R_N$ to a new route $R_{N+1}$ that includes a new geographical destination $D_{N+1}$ associated with a qualifying healthcare facility 650. In this embodiment, the on-board computer 204 and/or one or more of the system control nodes 502 are programmed via the dynamic routing system 308 in case of the on-board computer 204 and the routing system 512 in case of the one or more control nodes to execute a dynamic routing algorithm that utilizes artificial intelligence to continuously generate 1) a set of routes $R_{HFQ}$ from the ADV's current position to new geographical destinations $D_{HFQ}$ associated with one or more qualifying healthcare facilities, and 2) the shortest temporal route $R_{HFt}$ from the set of routes $R_{HFQ}$ that are continuously generated from the ADV's current position to one or more geographical destinations $D_{HFQ}$ associated with one or more qualifying healthcare facilities 250 based upon information concerning the navigable pathways in the relevant geographical region and within the set of continuously generated routes $D_{HFQ}$. The dynamic re-routing algorithm will now be described with reference to FIGS. 10A through 10C and the dynamic routing algorithms, functionality and techniques described herein.

For example, an emergency dynamic re-routing algorithm can be automatically initialized by an on-board computer 204 utilizing an occupant health monitoring system 312 in response to the detection of an event, in response to an initialization signal generated by one or more control system nodes and transmitted over a network to an on-board computer 204, or in response to an initialization that causes the on-board computer 204 to automatically execute an emergency dynamic re-routing algorithm. As described herein with reference to step 1002, an on-board computer 204 via an occupant health monitoring system 312 is continuously monitoring one or more occupants of the ADV using occupant sensors 208. As described herein, occupant sensors 208 can be wired sensors, wireless sensors, wearable sensors (e.g., one or more ADV wearable health sensor 270 and/or ADV wearable occupant sensor device 250 operated as described herein) and/or any combination of the aforementioned. As described with reference to step 1002, one or more of the occupant sensors 208 described herein are calibrated using baseline measurements for each occupant being monitored such that accurate and precise healthcare parameter measurements can be obtained by the on-board computer 204 via the occupant health monitoring system. This step can be performed at the initialization stage of the health monitoring algorithm and can also be performed one or more times with respect to the same relevant occupants during the trip. The calibration process is performed for one or more relevant wireless occupant health sensor devices 208 by on-board computer 204 utilizing occupant health monitoring system 312. In one or more embodiments, the calibration process is performed by the one or more ADV wearable occupant sensor devices 250 executing one or more health monitoring modules 256. The calibration process for the relevant occupant sensor devices 208 is performed when a new occupant to be monitored using the health monitoring algorithm is identified.

Once the occupant sensors are calibrated, the on-board computer 204 initiates a monitoring mode wherein occupant sensors 208 generate data that is indicative of one or more of a relevant occupant's health and/or current state of being. In one embodiment, the occupant sensors 208 continuously monitor and generate data that is indicative of the health and/or current physiological state of the relevant occupants for the entirety of the travel time. In another embodiment, the occupant sensors 208 enter a monitoring mode at intermittent times during a trip and lie in a resting/dormant state for other times during a trip. The monitoring and resting times for the occupant sensors 208 concerning a monitoring mode may be dependent upon the temporal length of the trip. In one embodiment, the data processed by the occupant sensors can be indicative of a patient's vital signs, physiological signs or other health information including, for example, electrocardiogram (ECG), electromyogram (EMG), heart rate (HR), body temperature, electrodermal activity (EDA), arterial oxygen saturation (SpO2), blood pressure (BP) and respiration rate (RR) as described herein and with reference to step 1004. For example, one or more of the occupant sensors 208 may be micro-electro-mechanical system (MEMS) sensors that include, for example, magnetic field sensors, gyroscopes, and accelerometers that measure motion and be used to generate data concerning cardiovascular and pulmonary health conditions and sleep analysis. One or more of the occupant sensors 208 can be a strain gauge that is worn by an occupant that generates data that is indicative of an occupant's respiratory cycle. For example, one or more wearable health sensors 270 worn by one or more ADV occupants can include one or more strain gauges that generate data while a relevant occupant breathes due to his/her chest expanding and contracting. One or more of the occupant sensors 208 may be a camera that measures facial expressions, movement, physical activity, etc., images of which can be indicative of one or more physiological states (e.g., epilepsy, heart attack, stroke, seizure, neurological conditions or episodes, illness due to temperature, panic attack, etc.). For example, one or more of the occupant sensors 208, such as one or more ADV wearable health sensors 270, can include one or more electrodes that are embedded in a piece of wearable clothing, such as a t-shirt, a headband, a sock, undergarments or any other piece of clothing that is in physical contact with an ADV occupant's skin to measure ECG, heart rate, and respiration rate. For example, one or more of the wearable health sensors 270 can be a plurality of electrodes encased in fabric and configured to generate ECG data from an ADV occupant when disposed in close proximity to an occupant's skin.

Once the occupant sensors 208 start generating health data as described herein, the on-board computer 204 utilizing occupant health monitoring system 312, as described with reference to step 1006, processes the health data received from one or more occupant sensors 208 and measures vital signs and physiological signs such as electrocardiogram (ECG), electromyogram (EMG), the heart rate (HR), a body temperature, electrodermal activity (EDA), arterial oxygen saturation (SpO$_2$), blood pressure (BP), respiration rate (RR) and/or other information that is indicative of one or more of an occupant's health and/or current state of being. Due to the calibration process of the occupant sensors 208 performed within the health monitoring algorithm, the determination of whether an event occurs for one or more of the relevant ADV occupants is an individualized determination for each monitored occupant. The on-board computer 204 is configured to monitor and process health data and information for a plurality of ADV occupants simultaneously. For example, if one more occupant sensors 208 is a wireless sensor that functions as discussed herein (e.g., camera), the on-board computer 204 will differentiate between the ADV occupants based upon the calibration data received and generated, data which can include baseline physiological data that is individual to an occupant (e.g., facial recognition, certain physiological signs and measurements, a person's identity, age, sex, race, finger prints, gender, etc. or other information received or determined by on-board computer 204 utilizing occupant identification system 320 or by other means). In one embodiment, ADV wearable occupant sensor device 250 is configured to transmit processed sensor data to an on-board computer 204 such that the on-board computer can process the information to determine if an event has been detected.

As described herein and with reference to step 1006, an event may include one or more health ailments and/or conditions that are negatively impacting one or more ADV occupants including, for example, stroke, heart attack, panic attack, heat stroke or other temperature ailments, epileptic seizure, one or more neurological conditions, respiratory ailments and/or conditions, heart ailments and/or conditions, and/or one or more conditions and/or ailments that affect an occupant's physiological, emotional or physical state. In one embodiment, an on-board computer 204 is continuously processing health sensor data to determine if one or more health metrics (e.g., electrocardiogram (ECG), electromyogram (EMG), heart rate (HR), body temperature, electrodermal activity (EDA), arterial oxygen saturation (SpO$_2$), blood pressure (BP) and respiration rate (RR) and/or other health metric or indicator of a person's current state of health) falls outside a normal range or above/below a predetermined threshold for one or more ADV occupants. In one embodiment, the on-board computer 204 utilizing the occupant health and monitoring system is programmed to be a multi-parameter event system such that two or more physiological variables and/or health metrics variables that fall outside a predetermined range for the relevant metric will trigger an event.

For example, with respect to step 1008, the on-board computer 204 is continuously monitoring the current state of health of one or more relevant ADV occupants such that, as described in step 1006, the on-board computer 204 will keep monitoring the occupant sensor 208 data until an event occurs. If no event occurs, as described with reference to the query block 1008 in FIG. 10A, the flow chart moves back to step 1006, the flow chart describing the continuous monitoring function of the on-board computer 204. If an on-board computer 204 determines that one or more health metrics falls outside of a normal range or is above/below a predetermined threshold for one or more ADV occupants and determines, based upon this and/or other health information either received or processed by the on-board computer 204, that an event has been detected, the on-board computer 204 automatically initiates an emergency dynamic re-routing algorithm that utilizes artificial intelligence (AI) to dynamically re-route the ADV to a qualified healthcare facility 650 described with reference to step 1010 and FIGS. 6B, 10B through 10D.

Figure 10A:
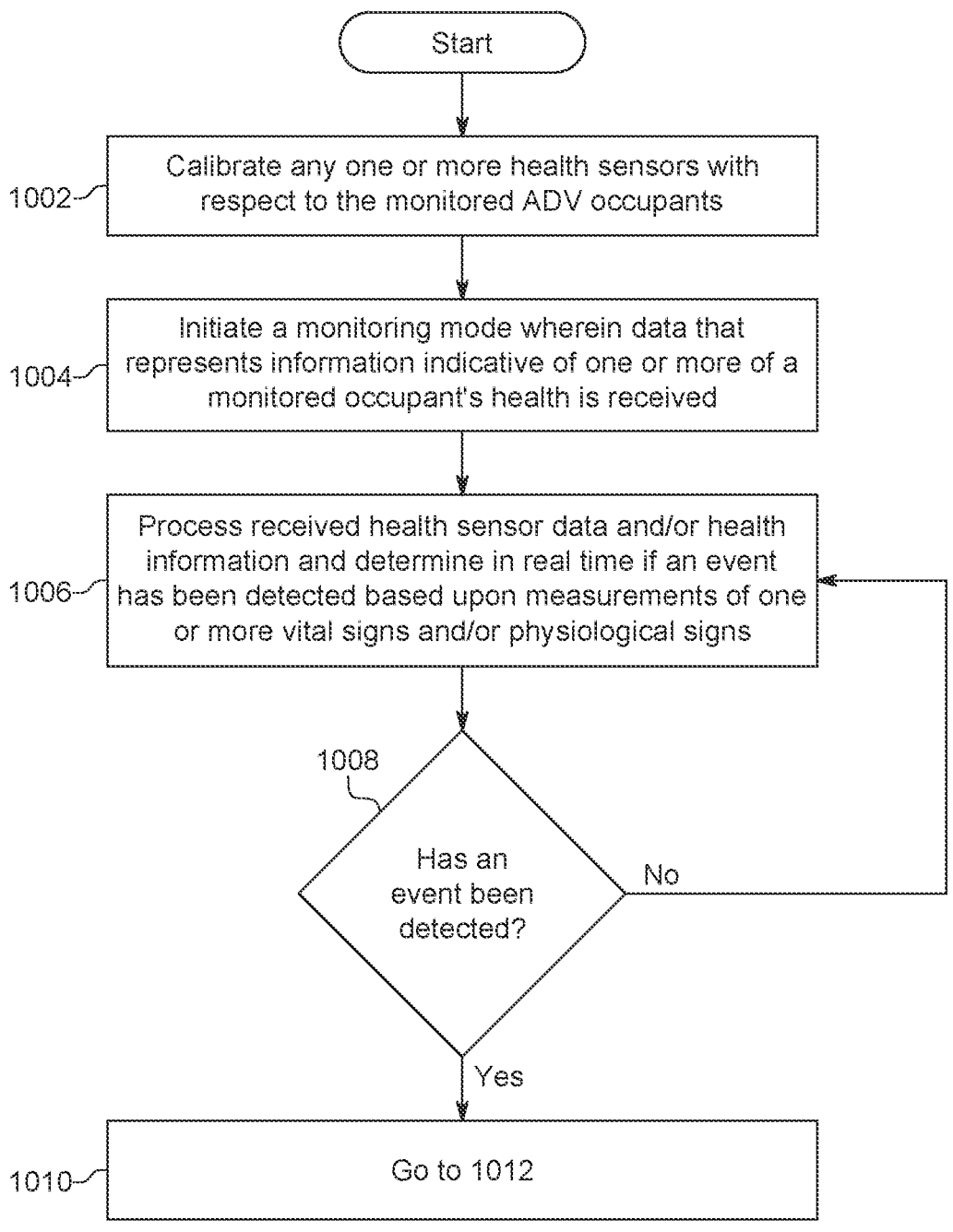
FIG. 10A is an example of a block diagram including a flow charts of one or more steps performed by one or more processors and/or other devices to alter a previous navigation route stored and/or undertaken by an ADV based upon sensor and/or other data received by the processor(s), according to some embodiments.

In one embodiment, upon the detection of an event, as described herein with reference to FIG. 10A, the on-board computer 204 and/or one or more of the system control nodes 502 are programmed via the dynamic routing system 308 in case of the on-board computer 204 or the routing system 512 in case of the one or more control nodes to execute a dynamic routing algorithm that utilizes artificial intelligence to continuously generate the shortest temporal route from the ADV's current position to a new destination $D_{HFQt}$ that represents a qualifying healthcare facility based upon information concerning the navigable pathways in the relevant geographical region. The emergency dynamic re-routing algorithm will now be described with reference to FIGS. 10B to 10D.

Figure 10C:
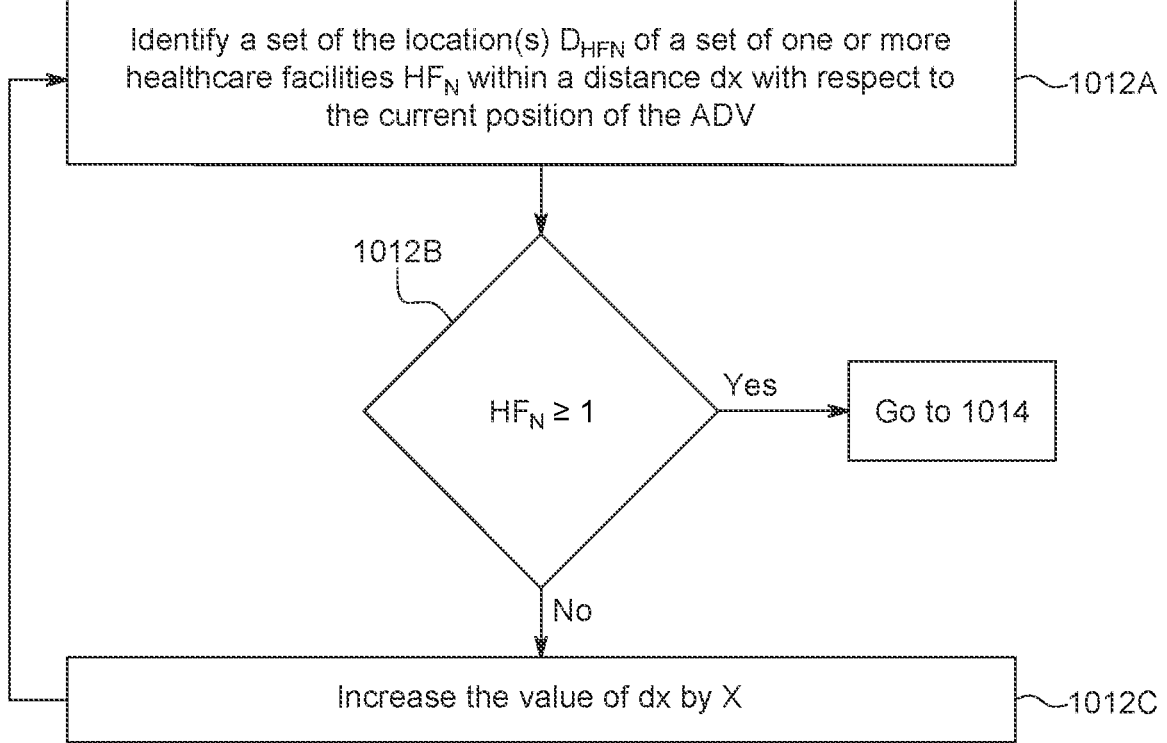
FIG. 10C is an example of a block diagram including a flow chart of one or more steps performed by one or more processors and/or other devices to alter a previous navigation route stored and/or undertaken by an ADV based upon sensor and/or other data received by the processor(s), according to some embodiments.

In this embodiment with reference to step 1012, while the ADV is autonomously navigating route $R_N$ to reach predetermined geographical destination $D_N$, in response to an event as described with reference to FIG. 10A, the on-board computer 204 automatically determines a set of one or more geographical locations $D_{HFN}$ that represent one or more healthcare and emergency facilities (collectively referred to as healthcare facilities herein) $HF_N$. In one embodiment, the flow chart depicted in FIG. 10C is referenced to describe an algorithm performed by an on-board computer 204 to determine the identification of a set of one or more locations $D_{HFN}$ that represent one or more healthcare and emergency facilities (healthcare facilities) $HF_N$ as described with reference to step 1012 in FIG. 10B. In this embodiment, an on-board computer 204 uses the mapping system 310 and the positioning system 304 to receive mapping information, that includes an initial predefined geographical area of at least a distance dx (e.g., 2 miles, 4 miles, 6 miles, 8 miles, or any other initial distance dx from the current positon of the ADV that can be processed by the on-board computer 204 for its intended purpose described herein) from the current geographical position of the ADV, and a set of geographical locations D HFN that represent one or more healthcare facilities 650 that reside within the geographical area. It will be appreciated that the distance value dx and distance value X may be any appreciable distance including but not limited to a radial distance from a relevant ADV, a distance stretching in a cardinal or ordinal direction from the current vehicle location, a distance from the current vehicle location and extending in the direction of the vehicle, and/or a distance from a known or identified geographical location and/or covering a known or identified geographical location or area (e.g., town, city, county, state, ward, province, etc.). It will also be appreciated that the distance value dx and distance value X can be the same, or can be different values and measured in different ways as described herein. In another embodiment, the on-board computer 204 can, in response to an event, request and receive mapping information, that includes an initial geographical area of at least a distance dx, and the set of geographical locations $D_{HFN}$, that reside within the geographical radius, from one or more control system nodes 502 via a network 608.

In one or more embodiments, due to the autonomous nature of the ADV and the impaired health of one or more ADV occupants, the on-board computer 204 is programmed to automatically determine the location of one or more health facilities 650 within an ever expanding geographical area defined as the area dx surrounding the current geographical position of the ADV. For example, with reference to FIGS. 10B and 10C, mapping information for a first geographical area (n=1) is generated for an initial distance of dx from the current vehicle location such that the mapping information, that includes among other things geographical information concerning geographical artifacts (i.e., in this instance the geographical locations of healthcare facilities), is utilized to identify the locations $D_{HFN}$ of a first set of healthcare facilities that includes one or more healthcare facilities $HF_N$, as described with reference to steps 1012 and 1012A. If the on-board computer 204 cannot identify the location $D_{HFN}$ of any healthcare facilities HFN within the first geographical area (n=1) that covers the initial distance dx, as described with reference to steps 1012 and 1012B, then the dynamic algorithm generates mapping information for a second geographical area (n=2) of dx+X by increasing dx by X (i.e., increasing the initial distance covered by the first geographical area (n=1) by a predetermined distance that covers a second geographical area (n=2) that is larger than the first geographical area (n=1)) by X, where X is a predefined value (e.g., 2 miles, 4 miles, 6 miles, 8 miles, or any other initial distance that can be processed by the on-board computer 204 if added to dx for its intended purpose described herein) as described with reference to steps 1012 and 1012C. Thereafter, utilizing the mapping information and the current position of the ADV, the on-board computer 204 utilizes the mapping information to identify the locations $D_{HFN}$ of any healthcare facilities $HF_N$ that are located within the new geographical area (n=2) that covers the increased distance dx, as described with reference to steps 1012 and 1012A. The on-board computer 204 executing the dynamic algorithm as described with reference to FIG. 10B at step 1012 and 10C will generate mapping information for a series of one or more successive geographical areas (n=m, where m=3-Y) in this example as mapping information for the geographical area n=2 has previously been performed) wherein the distance covered by each successive geographical area (n=m, where m=3 to Y) increase the distance dx by X until the on-board computer 204 identifies the locations $D_{HFN}$ of any one or more healthcare facilities $HF_N$ that are located within a distance dx of the current geographical location of the ADV.

Figure 10D:
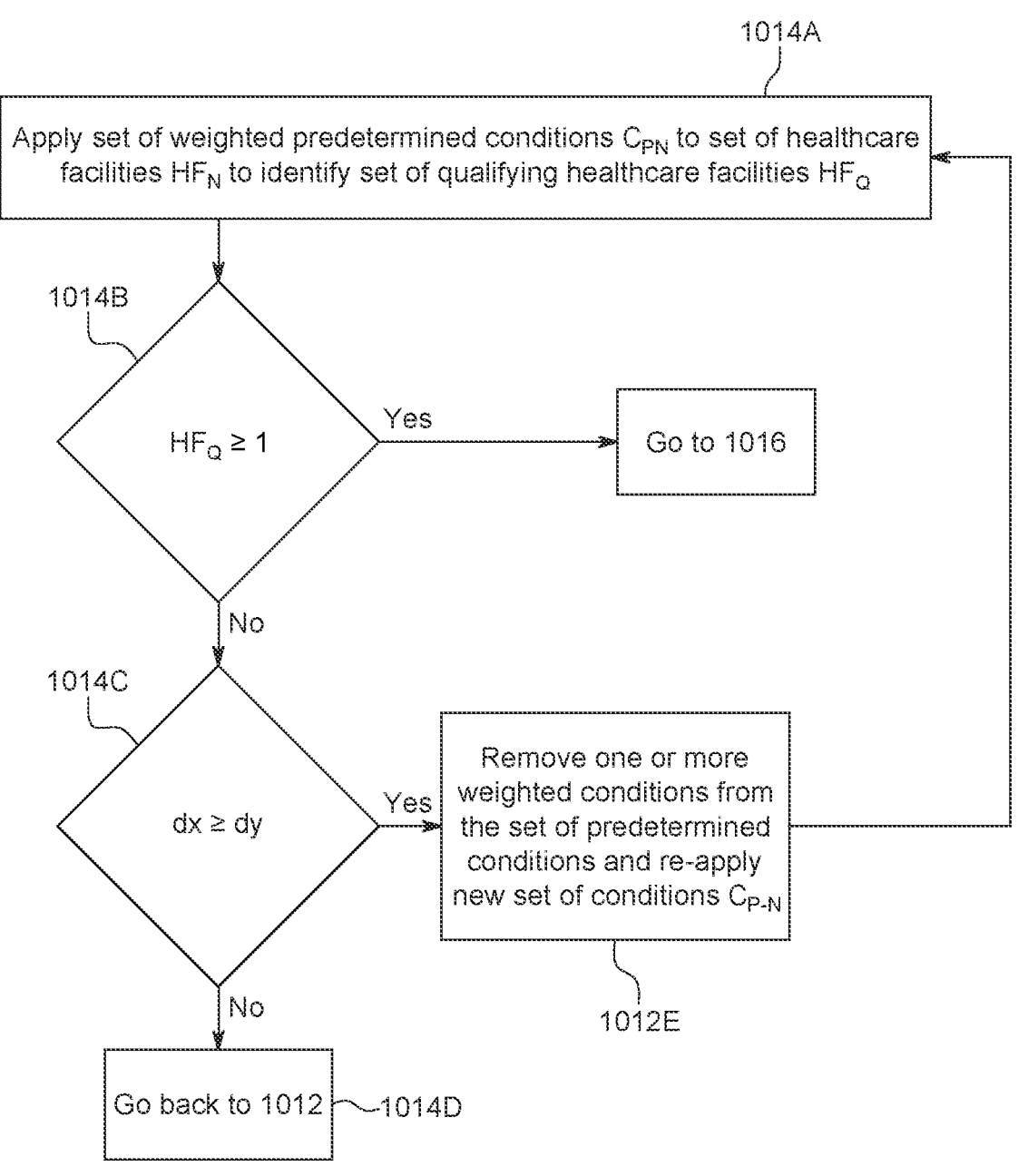
FIG. 10D is an example of a block diagram including a flow chart of one or more steps performed by one or more processors and/or other devices to alter a previous navigation route stored and/or undertaken by an ADV based upon sensor and/or other data received by the processor(s), according to some embodiments.

Once one or more locations $D_{HFN}$ of any one or more healthcare facilities HFN have been identified within a geographical area dx, the emergency dynamic re-routing algorithm, as described with reference to step 1014 in FIG. 10B and step 1014A in FIG. 10D, will apply a set of weighted predetermined conditions $C_{PN}$ stored in data storage 314 that will be applied by the on-board computer 204, utilizing the occupant health monitoring system 312, to each of the healthcare facilities $HF_N$ to determine if any one or more of the healthcare facilities HFN are qualifying healthcare facilities $HF_Q$ to render the type of care to an ADV occupant based upon the type of event detection. Here, the on-board computer 204 may compare one or more events to a predetermined hierarchal list of healthcare needs that are required to properly care for the relevant occupant(s) suffering from a particular event. If, after the application of the weighted predetermined conditions $C_{PN}$ to the set of healthcare facilities $HF_N$, a set of one or more qualifying health facilities $HF_Q$ was identified, as described with reference to step 1014 in FIG. 10B and step 1014B in FIG. 10D, the emergency dynamic re-routing algorithm will move on to step 1016 described with reference to FIG. 10B.

For example, in one or more embodiments the on-board computer 204, in response to an ADV occupant suffering a severe heart attack (i.e., event), will apply a set of weighted predetermined conditions $C_{PN}$ associated with a severe heart attack, which may include, from the most effective to the least effective, the following techniques to restore blood flow to part of the heart muscle that has been damaged during a heart attack: 1) surgery, 2) clot-dissolving drugs, 3) nitroglycerin and 4) aspirin. Any conventional weighting system can be implemented to take into account the level of effectiveness of each of the weighted conditions $C_{PN}$ associated with the events described herein as long as that convention can be used for this embodiment's intended purpose. For example, because surgery is weighted more heavily than the other 3 factors, the on-board computer 204 will first analyze the known characteristics of each healthcare facility $HF_N$ identified with reference to step 1012 in FIG. 10B to determine if any one or more of the healthcare facilities $HF_N$ have a surgeon on staff, as described in FIG. 10B at step 1014 and FIG. 10D at step 1014A. If, one or more healthcare facilities HFN have a surgeon on staff, then those facilities that have a surgeon on staff will be identified as qualifying healthcare facilities $HF_Q$ and, as described with reference to step 1014B in FIG. 10D, the emergency dynamic re-routing algorithm will go to step 1016. If none of the healthcare facilities $HF_N$ have a surgeon on staff, then, as described with respect to step 1014B, the on-board computer 204 will determine if the distance dx, that represents the geographical radius (e.g., miles) from the current location of the ADV within which healthcare facilities HFN were identified with reference to step 1012, is equal to or greater than ($\geq$) or greater than ($>$) (either condition may be utilized) a predetermined maximum distance dy that represents the maximum safe distance that the ailing ADV occupant can travel before he/she receives any healthcare. If it is determine that dx is less than dy, then the on-board computer 204 will execute the emergency dynamic re-routing algorithm and go back to step 1012, increase dx by X and determine a set of geographical location(s) $D_{HFN}$ for a set of one or more healthcare facilities $HF_N$ that includes any previously identified healthcare facilities $HF_N$ within the newly expanded geographical area dx. With reference to step 1014 in FIG. 10C, if no qualifying healthcare facilities $HF_Q$ are identified and dx is equal to or more than the safe maximum distance dy, then any healthcare facilities that have been identified and reside at locations that are equal to or greater than the safe maximum distance dy measured from the current vehicle geographical location are discarded and the remaining healthcare facilities are included in a set of pre-qualifying healthcare facilities. Then, for the pre-qualifying healthcare facility set, one or more of the conditions will be removed (e.g., the highest weighted value, in this example "surgery," will be removed from the hierarchal list of weighted conditions) as described with respect to step 1014E in FIG. 10D and the emergency re-routing algorithm will cycle back to step 1014A to determine if any of the healthcare facilities $HF_N$ with locations $D_{HFN}$ located within the geographical area dx, which is now equal to or greater than dy and included in the pre-qualifying healthcare facility set, can meet one or more of the remaining predetermined conditions $CP_{N-1}$ (e.g., have access to "clot-dissolving drugs"). If one or more of the healthcare facilities $HF_N$ meets the second most heavily weighted predetermined condition $CP_{N-1}$, then those one or more healthcare facilities $HF_N$ will be included in a set of qualifying healthcare facilities $HF_Q$ and the algorithm will move to step 1016, as described with reference to step 1014 in FIG. 10B. If none of the healthcare facilities $HF_N$ meet any of the conditions, then the vehicle will be routed to the closest healthcare facility using the dynamic routing algorithm described herein.

At step 1016, the on-board computer 204 automatically generates a set of routes $R_{HFQ}$ and their associated times $T_{HFQ}$ required to reach each qualifying healthcare facility in the set $HF_Q$ using the current geographical position of the ADV and the geographical locations D HFQ of each qualifying healthcare facility $HF_Q$ using techniques described herein (i.e., for simplicity these techniques described herein will not be described again in full with respect to the emergency dynamic re-routing algorithm). Once the on-board computer 204 has identified the set of qualifying routes $R_{HFQ}$, the on-board computer 204 determines the time $T_{HFQ}$ for each qualifying route $R_{HFQ}$, wherein $T_{HFQ}$ for each route $R_{HFQ}$ represents the total time to traverse the route $R_{HFQ}$ from the current geographical position of the ADV as described in step 1016. Once the set of qualifying routes $R_{HFQ}$ is determined, the time $T_{HFQ}$ for each qualifying route $R_{HFQ}$ is continuously updated and saved by the on-board computer 204 and/or the one or more control system nodes 502. With respect to step 1018, in response to the on-board computer 204 determining the time $T_{HFQ}$ for each qualifying route $R_{HFQ}$, the on-board computer 204 determines the current location of the ADV and, with respect to the current location, determines which time $T_{HFQ}$ for each of the qualifying routes $R_{HFQ}$ represents the shortest time, and sets the qualifying route that is associated with the shortest $T_{HFQt}$ as route $R_{HFQt}$. In this example, route $R_{HFQt}$ represents the shortest temporal path of all of the qualifying routes $R_{HFQ}$ in the set of qualifying routes $R_{HFQ}$ from the current position of the ADV to the destination $D_{HFQt}$. The time $T_{HFQt}$ for the shortest temporal path $R_{HFQt}$ is continuously updated and saved by the on-board computer 204 and/or the one or more control system nodes 502.

As described in step 1020, in response to the on-board computer 204 determining the time $T_{HFQt}$ for the shortest temporal path $R_{HFQt}$, then the on-board computer 204 will set the route $R_{HFQt}$ as the new route $R_{N+1}$ and automatically re-route the ADV to autonomously navigate the new route $R_{N+1}$ as described herein. Once the new route $R_{N+1}$ is set, the dynamic routing algorithm will recycle back to step 1012 and continuously cycle through the dynamic routing algorithm that utilizes artificial intelligence to automatically navigate the ADV as described herein until the ADV reaches a qualifying healthcare facility $HF_Q$. For example, if there is an accident on one or more navigable pathways that the ADV is currently navigating or is included in the current route $R_N$ the ADV is autonomously navigating, because the emergency dynamic re-routing algorithm is using artificial intelligence as described herein to automatically navigate the ADV by continuously generating alternative routes $R_{HFQ}$ in real-time to determine if any of those alternative routes represent a shorter temporal route to a qualifying healthcare facility from the ADV's current geographical position, the on-board computer 204 will automatically redirect the autonomous vehicle to navigate another alternative route (e.g., new route $R_{N+2}$ if the preceding route was route $R_{N+1}$) if the new route meets predetermined conditions and is a shorter temporal route to a qualifying healthcare facility than the current route the ADV is navigating.

Another embodiment can use one or more dynamic routing algorithms utilizing artificial intelligence described herein to automatically change the current destination of an ADV to a new geographical destination based upon one or more environmental conditions that either exists or will exists (based, for example, upon weather forecasts or other scheduled information) to impact one or more navigational pathways in the relevant geographical area. Still another embodiment can use one or more algorithms described herein to navigate an ADV to a plurality of predetermined geographical destinations in a single generated route. In this example, the ADV can dynamically choose any one of the plurality of predetermined destinations $D_N$ that represents the shortest temporal pathway from the current geographical location of the ADV, then move on to choose any one of the remaining plurality of predetermined destinations $D_{N-1}$ (i.e., a set of destinations that does not include the previously chosen destination) based upon which of the set of destinations $D_{N-2}$ represents the shortest temporal pathway from the current geographical location of the ADV, and so on until all of the plurality of predetermined destinations $D_N$ have been reached by the ADV.

FIG. 6B shows a system block diagram of one embodiment the ADV system network platform 600 that operates as a patient monitoring system in conjunction with an identified hospital or healthcare facility 650 (e.g., hospital, clinic, outpatient surgical center, outpatient clinic, physician offices, etc.) that may be communicatively coupled to the ADV system network platform 600. In one embodiment, the system 600 includes can include one or more patient transmitters that are included in wearable sensors described above for transmitting data to an ADV on-board computer 204 that, in turn, will transmit the processed data and other healthcare information to one or more control system nodes 502, as described herein. In one or more embodiments, the ADV system cloud network 610 that comprises one or more control nodes 502 that are described with reference to FIGS. 5 and 6B can include one or more web servers, and one or more waveform servers. The waveform servers and web servers are communicatively connected to the Internet such that data transmitted to the waveform servers and web servers from one or more ADVs including healthcare information concerning one or more occupants of an ADV can be transmitted by one or more of the waveform servers and web servers over a local network 608 to a hospital or other healthcare facility 650. For example, once an ADV is automatically re-routed to a healthcare facility as described herein, information concerning an arrival time of an ADV defined as the time it will the ADV to reach the relevant healthcare facility from the current geographical position of the ADV (i.e., the current destination of the ADV along a route once it has been re-routed in accordance with the emergency re-routing algorithm described herein) can be transmitted to the relevant healthcare facility along with other information, data and instructions. For example, once the relevant ADV carrying one or more occupants in need of medical assistance is re-routed to an identified healthcare facility, information including one or more of an occupant's vital signs, medical condition(s), physiological state(s), metrics, age, gender, height, weight, race, allergies, medications currently taken or in need of, primary doctor, next of kin, emergency contact information, and/or any other information concerning the one or more affected occupants can be transmitted to the healthcare facility while the ADV is autonomously navigating the current route to the healthcare facility.

In one embodiment, the web servers included in one or more control system nodes 502 are communicatively coupled to a healthcare facility via communications bus 660 such that a healthcare provider can transmit the relevant information to a database 656 that can be accessed by healthcare facility health provider computer stations 652. Information that is transmitted from the waveform servers and web servers containing healthcare information concerning one or more occupants within an ADV can be transmitted to a facility data storage facility 656 (e.g., database) such that it can become accessible to any healthcare facility station that has access to the data storage facility. For example, the transmitted information can become part of an occupant's patient record such that the information will be associated with any currently existing or newly created record(s) for the ADV occupant and stored in the relevant healthcare facility database for accessibility by those healthcare providers with access. For example, in an embodiment of FIG. 6B, a plurality of healthcare provider stations include a plurality of computer user interfaces that are configured to receive data from an applet that resides within a healthcare provider server and communicates with a waveform server or a web server that is one or more of the nodes 502 in the ADV system network over a public network such as a TCP/IP network to update an occupant's record for treating one or more relevant ADV occupants.

As described herein, ADV 602 includes an on-board computer 204 that functions to autonomously navigate "drive" the ADV along generated routes. Additionally, ADV 602 can be controlled manually when put into a manual mode of operation to operate as a normal vehicle. Here, an ADV occupant can manually operate a steering wheel, gas and brake pedals, turn signals, emergency lights, utilize one or more minors, and accelerate and/or come to a complete stop such that the ADV can be driven like a conventional vehicle.

The flowchart and block diagrams in the Figures referenced to describe one or more embodiments illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s) and/or method steps. It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One or more embodiments of examples of the computer devices that can be utilized in within the ADV system network platform 600, as described with reference to FIGS. 6A and 6B, and/or computers communicatively connected to the network platform 600 will now be described with reference to FIGS. 1-6. For example, on-board computer 204, ADV wearable occupant sensor device 250, ADV wearable health sensor 270, ADV control system node 502, and/or one more healthcare facility workstations 652 and healthcare facility server 654 one or more computer components and corresponding functionality as described below to enable the functionality of the computer devices described herein with reference to FIGS. 1-6, and can include communication transceivers that enable wired and/or wireless communication of device data, device data including transmitted data, received data, real time transmission of data and/or data scheduled for broadcast, data packets of the data, and any other transmission or reception form of communication using transceivers.

For example the computer devices on-board computer 204, ADV wearable occupant sensor device 250, ADV wearable health sensor 270, ADV control system node 502, and/or one more healthcare facility workstations 652 and healthcare facility server 654 may be configured to provide voice and/or data communications functionality in accordance with different types of wireless network systems. For example, ADV 204, in one embodiment, includes a microphone wherein one or more ADV occupants can transmit voice data from the on-board computer 204 to one or more computer system nodes 502 that, in turn, may transmit the voice data to one or more healthcare facilities 650 via network 608, healthcare facility network communications backbone 660 (e.g., a communications bus) to one or more healthcare provider workstations 652 and the associated healthcare providers, as described with reference to FIG. 6B. Mobile devices 606 may also communicate with the ADV control network platform 600 via a communication network. Examples of wireless network systems that may be utilized as networks 608, 610 and any one or more networks connected to healthcare facility network communications backbone 660 to operate to connect the communicatively connect the healthcare facility 650 to the networks descried herein may further include (but are not limited to) a wireless local area network (WLAN) system, wireless metropolitan area network (WMAN) system, wireless wide area network (WWAN) system, and the like. Examples of suitable wireless network systems offering data communication services may include (but are not limited to) the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and the like. It should be noticed that references WAN and WWAN may be made interchangeably throughout the disclosure and/or references to LAN and WLAN may be made interchangeably throughout the disclosure.

The computer devices on-board computer 204, ADV wearable occupant sensor device 250, ADV wearable health sensor 270, ADV control system node 502, and/or one more healthcare facility workstations 652 and healthcare facility server 654 may also include, for example, one or more data input ports. For example, I/O interfaces 260 for the ADV wearable occupant sensor device 250, I/O interfaces 270 for the ADV wearable health sensor(s) 270, I/O interfaces 316 for the on-board computer 204, and the I/O interfaces for any of the additional computers described herein may be configured such that any type of data, media content, and/or inputs can be received, such as user-selectable inputs using display 210, messages using display 210 or a microphone (not shown) connected to the on-board computer 204, recorded video content, and any other type of audio, video, and/or image data received from any content and/or data source, including the occupant sensors 208 which includes ADV wearable occupant sensor device 250 and ADV wearable health sensor(s) 270, the navigation and control sensors 218, ADV reference sensors 216, etc. The data input ports may also include USB ports, coaxial cable, internal connectors for flash memory or other memory devices described herein, and readable media such as flash memory sticks, CDs and DVDs. The data input ports may be used to couple the computer device to components, peripherals, or accessories such as microphones or cameras. Additionally, the computer device may include media capture components, such as an integrated microphone to capture audio and a camera to capture still images and/or video media content.

The transceiver modules utilized in on-board computer 204 (e.g., transceiver 206, communications transceiver 214, ADV device controller 212 occupant sensors 208), ADV wearable occupant sensor device 250, ADV wearable health sensor 270 or in any one or more of the other described herein such as, for example, navigation and control sensors 218, ADV reference sensors 216, etc. may include one or more transceivers configured to communicate using different types of protocols, communication ranges, operating power requirements, RF sub-bands, information types (e.g., voice or data), use scenarios, applications, and/or the like. In various embodiments, one or more of the aforementioned transceivers may comprise, for example, one or more transceivers configured to support communications between ADVs 602, as described with reference to FIGS. 6A and 6B using any number or combination of communication standards. For example, the transceivers included in or utilized by the on-board computers 204 of ADVs 602 in various embodiments may comprise one or more transceivers configured to perform data communications in accordance with one or more wireless communications protocols such as (but not limited to) WLAN protocols (e.g., IEEE 802.11 a/b/g/n, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The computer devices including on-board computer 204, ADV wearable occupant sensor device 250, ADV wearable health sensor 270, ADV control system node 502, and/or one more healthcare facility workstations 652 and healthcare facility server 654 may also include one or more processors, any of microprocessors, controllers, and the like, which process computer-executable instructions to enable operation of the device and/or an ADV. Alternatively or in addition, the computer device can be implemented with any one or combination of software, hardware, firmware, or fixed logic circuitry that is implemented in connection with processing and control circuits. Although generally not shown, The computer devices including on-board computer 204, ADV wearable occupant sensor device 250, ADV wearable health sensor 270, ADV control system node 502, and/or one more healthcare facility workstations 652 and healthcare facility server 654 may also include a system bus or data transfer system that couples the various components within the device (e.g., communications backbone 660 described with reference to FIG. 6B). A system bus can include any one or combination of different bus structures, such as a memory bus or memory controller, a peripheral bus, a universal serial bus, and/or a processor or local bus that utilizes any of a variety of bus architectures.

The computer devices including on-board computer 204, ADV wearable occupant sensor device 250, ADV wearable health sensor 270, ADV control system node 502, and/or one more healthcare facility workstations 652 and healthcare facility server 654 may also include one or more memory devices 414 that enable data storage, examples of which include random access memory (RAM), non-volatile memory (e.g., read-only memory (ROM), NAND flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer devices may also include a mass storage media device.

In one or more embodiments, memory devices included within the computer devices including memory device 314 (described with reference to FIG. 4) included in on-board computer 204, memory device 252 included in ADV wearable occupant sensor device 250, memory device 504 included in ADV control system node(s) 502, and/or the memory device included in the one more healthcare facility workstations 652 and healthcare facility server 654 provides data storage mechanisms to store data and/or information generated, transmitted, and/or received from the ADV sensors described herein, mobile devices 606 described with respect to FIG. 6A, device data such as one or more sensors described herein, other types of information and/or data, and various device applications including reference and positioning system 304, navigation and driving mode system 306, dynamic routing system 308, mapping system 310, occupant health monitoring system 312 and other systems described herein that are configured to, in one or more embodiments described herein, software applications.

For example, any one or more of the reference and positioning system 304, navigation and driving mode system 306, dynamic routing system 308, mapping system 310, occupant health monitoring system 312 and operating system (not illustrated) (i.e., systems that may be configured as device applications) included in on-board computer 204 can be maintained as software instructions within memory device 314 and executed on the one or more processors 302. Similarly, one or more of the mapping SYSTEM 508, ADV reference system 510, routing system 512, and occupant ID system 522 (i.e., systems that may be configured as device applications) can be maintained as software instructions within memory device 504 and executed on the one or more processors 514 included in the ADV control and system nodes 502. Each of the device applications may also include a device manager, such as any form of a control application, software application, signal-processing and control module, code that is native to a particular device, a hardware abstraction layer for a particular device, and so on.

In one or more embodiments, on-board computer 204 and/or one or more control system nodes 502 include an in-memory processing system configured to perform in-memory processing that can include memory data grid applications (e.g., Hazelcast IMDG, Infinispan, Pivotal GemFire XD, Oracle Coherence, GridGain Enterprise Edition, IBM WebSphere Application Server, Ehcache, XAP, Red Hat JBoss Data Grid, ScaleOut SateServer, Galaxy, etc.) to retrieve data from the associated accessible data storage device. In one or more embodiments, on-board computer 204 includes one or more RAM memory devices (e.g., SDRAM, DDR SDRAM, DDR2 SDRAM, DDR3 SDRAM, DDR4 SDRAM, etc.)(not shown) and/or flash memory (not shown) that may be utilized to perform in-memory processing in association with data storage 314 (e.g., a database, disk, memory bank, or any other suitable large memory device) or other storage devices accessible by on-board computer 204. Similarly, one or more nodes 502 may utilize one or more RAM memory devices 524 to perform in-memory processing in association with the data and information stored in the map storage database 506 and/or other storage devices associated with the one or more relevant nodes (see examples associated with on-board computer data storage device 314). For example, the relevant data and/or information retrievably stored in data storage 314 and storage database 506 or any other storage device that is utilized to retrievably store and/or generate information (e.g., mapping information, navigational information, health information, routes, reference information including current position of one or more ADVs, timing information including current times to reach a current destination, etc.) can also be maintained in one or more RAM memory devices, or devices utilized as RAM memory device (e.g., flash memory), and accessed utilizing an processing in-memory system.

The RAM memory device(s) described herein can host all of the relevant data utilized to navigate one or more ADVs, monitor one or ADV occupants in one or more ADVs, generate routes for one or more ADVs as described herein, continuously monitor one or more ADVs as described herein utilizing the sensors described herein and/or, in one or more embodiments, host the entirety of the large memory structures in memory. In these embodiments, to ensure the durability of the data and information stored in RAM, copies of the data can also be stored in the associated long-term memory devices (i.e., data storage 314 and/or storage system 506). Flash memory may also be used in association with or in place of the RAM memory device(s) to be used for the on-board computer system memory and/or for the system memory for one or more nodes 502 for in-memory processing. For example, all of the relevant data required by either the on-board computer 204 and/or control system nodes 502 to perform the functions described herein can be loaded into the associated system memory from the source database so that it can be processed in-memory instead of repetitively querying one or more databases for the required information. In one or more embodiments, the contents of one or more relevant databases (i.e., the entire database) may be loaded into the system memory for processing.

In one embodiment, the on-board computer 204 includes audio and video processing systems that are included in the navigation and driving mode system 306, ADV device controller 212, and occupant health monitoring system 312 that generates audio data and video data to assist in navigating the ADV as described herein, monitor one or more ADV occupants as described herein, and generate display data as described herein for a display system 210. Similarly, ADV wearable occupant sensor device 250 includes audio and video processing systems for communicating health information to a relevant ADV occupant. In one embodiment, each ADV occupant is wearing an ADV wearable occupant sensor device 250 and one or more ADV wearable health sensor devices 270 to assist the ADV in monitoring the health of the ADV occupants. The audio system and/or the display system may include any devices that process, display, and/or otherwise render audio, video, display, and/or image data.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 428. Additionally, the audio system and/or the display system may be external components to the computer device, or alternatively, are integrated components of the example computer device.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure has been described more fully herein with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The detailed description herein is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context. As used herein, the terms "information" and "data" are interchangeable.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventor that variations and equivalents of the invention are within the scope of the claims while the description, abstract and drawings are not to be used to limit the scope of the invention. The invention is specifically intended to be as broad as the claims below and their equivalents.

What is claimed is:

1. An apparatus comprising:
one or more processors; and
a memory having non-transitory instructions stored thereon that, upon execution by the one or more processors, causes the one or more processors to:
    determine an occurrence of an emergency event associated with a vehicle;
    determine a current geographical location of the vehicle;
    identify, based on a determined type of the emergency event, a plurality of geographical artifacts to which the vehicle may be routed;
    determine that a subset of geographical artifacts of the plurality of geographical artifacts is located within a predetermined maximum safety distance from the current geographical location of the vehicle;
    select a first geographical artifact from the subset of geographical artifacts based on the first geographical artifact having a shortest temporal route from the current geographical location of the vehicle to a geographical location of the first geographical artifact; and
    send a control signal configured to cause the vehicle to navigate to the geographical location of the first geographical artifact.

2. The apparatus of claim 1, wherein the instructions further cause the one or more processors to send, to the vehicle, data indicative of a routing instruction configured to route the vehicle to the first geographical artifact.

3. The apparatus of claim 1, wherein the instructions further cause the one or more processors to route the vehicle to the first geographical artifact.

4. The apparatus of claim 1, wherein the vehicle is being at least partially autonomously controlled while the determination of the occurrence of the emergency event happens.

5. The apparatus of claim 1, wherein the emergency event comprises a health condition.

6. The apparatus of claim 1, wherein the plurality of geographical artifacts comprise one or more healthcare facilities.

7. The apparatus of claim 1, wherein the instructions further cause the one or more processors to select the first geographical artifact based at least in part upon a comparison of predetermined conditions associated with the emergency event to a list of healthcare facility characteristics associated with the plurality of geographical artifacts.

8. The apparatus of claim 1, wherein the determination of the occurrence of the emergency event is based on sensor data collected from one or more sensors of the vehicle.

9. The apparatus of claim 8, wherein the sensor data is indicative of at least one of a vehicle occupant's one or more vital signs.

10. The apparatus of claim 9, wherein the instructions further cause the one or more processors to calibrate the one or more sensors of the vehicle with respect to the vehicle occupant based on a determined normal range for the one or more vital signs, wherein the determined normal range is based on the sensor data collected over time.

11. The apparatus of claim 10, wherein the instructions further cause the one or more processors to:

initiate a monitoring mode wherein the sensor data is received by the at least one of the one or more processors from the one or more sensors; and
process the received sensor data to determine in real time if one or more events comprising the occurrence of the emergency event is detected.

12. An apparatus comprising:
one or more processors; and
a memory having non-transitory instructions stored thereon that, upon execution by the one or more processors, causes the one or more processors to:
    determine an occurrence of an emergency event associated with a vehicle;
    determine a current geographical location of the vehicle;
    determine, based on a determined type of the emergency event, that no geographical artifacts of a plurality of geographical artifacts to which the vehicle may be routed are within a first distance from the current geographical location;
    determine, in response to the determination that no geographical artifacts are within the first distance, that a subset of geographical artifacts of the plurality of geographical artifacts is located within a predetermined maximum safety distance from the current geographical location of the vehicle;
    select a first geographical artifact from the subset of geographical artifacts based on the first geographical artifact having a shortest temporal route from the current geographical location of the vehicle to a geographical location of the first geographical artifact; and
    send a control signal configured to cause the vehicle to navigate to the geographical location of the first geographical artifact.

13. The apparatus of claim 12, wherein the instructions further cause the one or more processors to send, to the vehicle, data indicative of a routing instruction configured to route the vehicle to the first geographical artifact.

14. The apparatus of claim 12, wherein the instructions further cause the one or more processors to route the vehicle to the first geographical artifact.

15. An apparatus comprising:
one or more processors; and
a memory having non-transitory instructions stored thereon that, upon execution by the one or more processors, causes the one or more processors to:
    determine an occurrence of an emergency event associated with an occupant of a vehicle, wherein the emergency event comprises a health issue of the occupant;
    determine a current geographical location of the vehicle;
    identify, based on a determined type of the emergency event, a plurality of geographical artifacts to which the vehicle may be routed;
    determine that a subset of geographical artifacts of at the plurality of geographical artifacts is located within a predetermined maximum safety distance from the current geographical location of the vehicle;
    select a first geographical artifact from the subset of geographical artifacts based on the first geographical artifact having a shortest temporal route from the current geographical location of the vehicle to a geographical location of the first geographical artifact; and send a control signal configured to cause the vehicle to navigate to the geographical location of the first geographical artifact.

16. The apparatus of claim 15, wherein the health issue comprises at least one of:

blood pressure of the occupant being lower than a first threshold value, the blood pressure of the occupant being higher than a second threshold value, the occupant experiencing shortness of breath, the occupant having difficulty speaking, the occupant having a change in vision, the occupant is experiencing hyperglycemia, the occupant is experiencing hyperosmolar hyperglycemic state, the occupant is experiencing diabetic ketoacidosis, the occupant's blood sugar levels are below a third threshold value, the occupant's heart rate is outside of a normal heart rate range, the occupant's temperature is outside of a normal temperature range, the occupant being in shock, the occupant experiencing bradycardia, the occupant experiencing a heart attack, or the occupant experiencing heart failure.

17. The apparatus of claim 15, wherein the determination of the occurrence of the emergency event associated with the occupant of the vehicle comprises the one or more processors further configured to:

monitor one or more vitals for at least a threshold amount of time, and determine that, during the threshold amount of time, that the one or more vitals is outside of a threshold range.

* * * * *